US007219354B1

(12) United States Patent
Huang et al.

(10) Patent No.: US 7,219,354 B1
(45) Date of Patent: May 15, 2007

(54) VIRTUALIZING SUPER-USER PRIVILEGES FOR MULTIPLE VIRTUAL PROCESSES

(75) Inventors: Xun Wilson Huang, Mountain View, CA (US); Cristian Estan, La Jolla, CA (US); Srinivasan Keshav, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 329 days.

(21) Appl. No.: 09/747,687

(22) Filed: Dec. 22, 2000

(51) Int. Cl.
*G06F 3/00* (2006.01)
*G06F 9/54* (2006.01)

(52) U.S. Cl. .................... 719/328; 709/203; 726/15
(58) Field of Classification Search ........ 709/100–108, 709/203, 330; 713/200; 719/328, 330; 718/1, 718/100, 102; 726/15
See application file for complete search history.

(56) References Cited

U.S. PATENT DOCUMENTS

| 3,377,624 A | 4/1968 | Nelson et al. |
| 4,177,510 A | 12/1979 | Appell et al. ............... 364/200 |
| 5,189,667 A | 2/1993 | Esaki et al. |
| 5,212,793 A | 5/1993 | Donica et al. |
| 5,226,160 A | 7/1993 | Waldron et al. |
| 5,249,290 A | 9/1993 | Heizer |
| 5,263,147 A | 11/1993 | Francisco et al. ........... 395/425 |
| 5,325,530 A | 6/1994 | Mohrmann |
| 5,437,032 A | 7/1995 | Wolf et al. |
| 5,528,753 A | 6/1996 | Fortin |
| 5,572,680 A | 11/1996 | Ikeda et al. |
| 5,584,023 A | 12/1996 | Hsu |
| 5,603,020 A | 2/1997 | Hashimoto et al. ......... 395/616 |
| 5,615,400 A | 3/1997 | Cowsar et al. |
| 5,623,492 A | 4/1997 | Teraslinna |
| 5,636,371 A | 6/1997 | Yu ............................. 395/500 |
| 5,640,595 A | 6/1997 | Baugher et al. |
| 5,692,047 A | 11/1997 | McManis ....................... 380/4 |
| 5,706,097 A | 1/1998 | Schelling et al. ........... 358/296 |
| 5,706,453 A | 1/1998 | Cheng et al. |
| 5,708,774 A | 1/1998 | Boden |
| 5,719,854 A | 2/1998 | Choudhury et al. |
| 5,727,147 A | 3/1998 | Van Hoff |

(Continued)

FOREIGN PATENT DOCUMENTS

| JP | 64-002145 | 1/1989 |
| WO | WO 99/39261 | 8/1999 |

OTHER PUBLICATIONS

Boehm, B., "Managing Software Productivity and Reuse," IEEE Computer, vol. 32, No. 9, Sep. 1999, 3 pages.

(Continued)

*Primary Examiner*—William Thomson
*Assistant Examiner*—Li Zhen
(74) *Attorney, Agent, or Firm*—Fenwick & West LLP

(57) ABSTRACT

Super-user privileges are virtualized by designating a virtual super-user for each of a plurality of virtual processes and intercepting system calls for which actual super-user privileges are required, which are nevertheless desirable for a virtual super-user to perform in the context of his or her own virtual process. In one embodiment, a computer operating system includes multiple virtual processes, such as virtual private servers. Each virtual process can be associated with one or more virtual super-users. When an actual process makes a system call that requires actual super-user privileges, the call is intercepted by a system call wrapper.

2 Claims, 15 Drawing Sheets

U.S. PATENT DOCUMENTS

| | | | |
|---|---|---|---|
| 5,727,203 A | 3/1998 | Hapner et al. | |
| 5,748,614 A | 5/1998 | Wallmeier | |
| 5,752,003 A | 5/1998 | Hart | |
| 5,761,477 A | 6/1998 | Wahbe et al. | 395/406 A |
| 5,764,889 A * | 6/1998 | Ault et al. | 713/200 |
| 5,781,550 A | 7/1998 | Templin et al. | 370/401 |
| 5,799,173 A | 8/1998 | Gossler et al. | |
| 5,809,527 A | 9/1998 | Cooper et al. | 711/133 |
| 5,828,893 A | 10/1998 | Weid et al. | 395/800 |
| 5,838,686 A | 11/1998 | Ozkan | |
| 5,838,916 A | 11/1998 | Domenikos et al. | 395/200.49 |
| 5,842,002 A | 11/1998 | Schnurer et al. | 395/500 |
| 5,845,129 A | 12/1998 | Wendorf et al. | 395/726 |
| 5,850,399 A | 12/1998 | Ganmukhi et al. | |
| 5,860,004 A | 1/1999 | Fowlow et al. | |
| 5,864,683 A | 1/1999 | Boebert et al. | |
| 5,889,956 A | 3/1999 | Hauser et al. | |
| 5,889,996 A | 3/1999 | Adams | |
| 5,892,968 A | 4/1999 | Iwasaki et al. | |
| 5,905,730 A | 5/1999 | Yang et al. | |
| 5,905,859 A | 5/1999 | Holloway et al. | |
| 5,913,024 A | 6/1999 | Green et al. | 395/186 |
| 5,915,085 A | 6/1999 | Koved | 395/186 |
| 5,915,095 A | 6/1999 | Miskowiec | |
| 5,918,018 A | 6/1999 | Gooderum et al. | 395/200.55 |
| 5,920,699 A | 7/1999 | Bare | |
| 5,933,603 A | 8/1999 | Vahalia et al. | |
| 5,937,159 A | 8/1999 | Meyers et al. | 395/187.01 |
| 5,956,481 A | 9/1999 | Walsh et al. | 395/186 |
| 5,961,582 A * | 10/1999 | Gaines | 718/1 |
| 5,978,373 A | 11/1999 | Hoff et al. | |
| 5,982,748 A | 11/1999 | Yin et al. | |
| 5,987,242 A | 11/1999 | Bentley et al. | |
| 5,987,524 A | 11/1999 | Yoshida et al. | |
| 5,987,608 A | 11/1999 | Roskind | |
| 5,991,812 A | 11/1999 | Srinivasan | |
| 5,999,963 A | 12/1999 | Bruno et al. | |
| 6,016,318 A | 1/2000 | Tomoike | |
| 6,018,527 A | 1/2000 | Yin et al. | |
| 6,023,721 A | 2/2000 | Cummings | 709/201 |
| 6,038,608 A | 3/2000 | Katsumanta | |
| 6,038,609 A | 3/2000 | Geulen | |
| 6,047,325 A | 4/2000 | Jain et al. | |
| 6,055,617 A | 4/2000 | Kingsbury | |
| 6,055,637 A * | 4/2000 | Hudson et al. | 726/20 |
| 6,061,349 A | 5/2000 | Coile et al. | |
| 6,065,118 A | 5/2000 | Bull et al. | 713/200 |
| 6,075,791 A | 6/2000 | Chiussi et al. | |
| 6,078,929 A | 6/2000 | Rao | |
| 6,078,957 A | 6/2000 | Adelman et al. | |
| 6,086,623 A | 7/2000 | Broome et al. | |
| 6,092,178 A | 7/2000 | Jindal et al. | |
| 6,094,674 A | 7/2000 | Hattori et al. | |
| 6,101,543 A | 8/2000 | Alden et al. | |
| 6,108,701 A | 8/2000 | Davis et al. | |
| 6,108,759 A | 8/2000 | Orcutt et al. | 711/173 |
| 6,122,673 A | 9/2000 | Basak et al. | |
| 6,154,776 A | 11/2000 | Martin | |
| 6,154,778 A | 11/2000 | Koistinen et al. | |
| 6,161,139 A * | 12/2000 | Win et al. | 709/225 |
| 6,167,520 A | 12/2000 | Touboul | 713/200 |
| 6,172,981 B1 | 1/2001 | Cox et al. | |
| 6,189,046 B1 | 2/2001 | Moore et al. | |
| 6,192,389 B1 | 2/2001 | Ault et al. | 709/101 |
| 6,192,512 B1 | 2/2001 | Chess | 717/5 |
| 6,230,203 B1 | 5/2001 | Koperda et al. | |
| 6,240,463 B1 | 5/2001 | Benmohamed et al. | |
| 6,247,057 B1 | 6/2001 | Barrera | |
| 6,247,068 B1 | 6/2001 | Kyle | |
| 6,259,699 B1 | 7/2001 | Opalka et al. | |
| 6,266,678 B1 | 7/2001 | McDevitt et al. | |
| 6,269,404 B1 | 7/2001 | Hart et al. | |
| 6,279,039 B1 | 8/2001 | Bhat et al. | |
| 6,279,040 B1 | 8/2001 | Ma et al. | |
| 6,282,581 B1 | 8/2001 | Moore et al. | |
| 6,282,703 B1 | 8/2001 | Meth et al. | |
| 6,286,047 B1 | 9/2001 | Ramanathan et al. | |
| 6,298,479 B1 | 10/2001 | Chessin et al. | |
| 6,314,558 B1 | 11/2001 | Angel et al. | |
| 6,327,622 B1 | 12/2001 | Jindal et al. | |
| 6,336,138 B1 | 1/2002 | Caswell et al. | |
| 6,351,775 B1 | 2/2002 | Yu | |
| 6,353,616 B1 | 3/2002 | Elwalid et al. | |
| 6,363,053 B1 | 3/2002 | Schuster et al. | |
| 6,366,958 B1 | 4/2002 | Ainsworth et al. | |
| 6,370,583 B1 | 4/2002 | Fishler et al. | |
| 6,374,292 B1 * | 4/2002 | Srivastava et al. | 709/206 |
| 6,381,228 B1 | 4/2002 | Prieto, Jr. et al. | |
| 6,385,638 B1 | 5/2002 | Baker-Harvey | |
| 6,385,722 B1 | 5/2002 | Connelly et al. | |
| 6,389,448 B1 | 5/2002 | Primak et al. | |
| 6,393,484 B1 | 5/2002 | Massarani | |
| 6,425,003 B1 | 7/2002 | Herzog et al. | |
| 6,430,622 B1 | 8/2002 | Aiken, Jr. et al. | |
| 6,434,631 B1 | 8/2002 | Bruno et al. | |
| 6,434,742 B1 | 8/2002 | Koepele, Jr. | |
| 6,438,134 B1 | 8/2002 | Chow et al. | |
| 6,442,164 B1 | 8/2002 | Wu | |
| 6,449,652 B1 * | 9/2002 | Blumenau et al. | 709/229 |
| 6,457,008 B1 | 9/2002 | Rhee et al. | |
| 6,463,459 B1 | 10/2002 | Orr et al. | |
| 6,470,398 B1 | 10/2002 | Zargham et al. | |
| 6,484,173 B1 * | 11/2002 | O'Hare et al. | 707/9 |
| 6,487,578 B2 | 11/2002 | Ranganathan | |
| 6,487,663 B1 | 11/2002 | Jaisimha et al. | |
| 6,490,670 B1 | 12/2002 | Collins et al. | |
| 6,496,847 B1 * | 12/2002 | Bugnion et al. | 718/1 |
| 6,499,137 B1 | 12/2002 | Hunt | |
| 6,529,950 B1 | 3/2003 | Lumelsky et al. | |
| 6,529,985 B1 * | 3/2003 | Deianov et al. | 710/260 |
| 6,542,167 B1 | 4/2003 | Darlet et al. | |
| 6,553,413 B1 | 4/2003 | Leighton et al. | |
| 6,578,055 B1 * | 6/2003 | Hutchison et al. | 707/204 |
| 6,578,068 B1 | 6/2003 | Bowman-Amuah | |
| 6,580,721 B1 | 6/2003 | Beshai | |
| 6,590,588 B2 | 7/2003 | Lincke et al. | |
| 6,622,159 B1 | 9/2003 | Chao et al. | |
| 6,647,422 B2 * | 11/2003 | Wesinger et al. | 709/228 |
| 6,658,571 B1 * | 12/2003 | O'Brien et al. | 713/200 |
| 6,691,312 B1 | 2/2004 | Sen et al. | |
| 6,725,456 B1 | 4/2004 | Bruno et al. | |
| 6,760,775 B1 | 7/2004 | Anerousis et al. | |
| 6,779,016 B1 * | 8/2004 | Aziz et al. | 709/201 |
| 6,785,728 B1 * | 8/2004 | Schneider et al. | 709/229 |
| 6,820,117 B1 | 11/2004 | Johnson | |
| 6,859,835 B1 | 2/2005 | Hipp | |
| 6,912,590 B1 | 6/2005 | Lundback et al. | |
| 2003/0061338 A1 | 3/2003 | Stelliga | |

OTHER PUBLICATIONS

Corbato, F. J. et al. "An Experimental Timesharing System," Proceedings of the American Federation Of Information Processing Societies Spring Joint Computer Conference, San Francisco, CA, May 1-3, 1962, pp. 335-344.

Deutsch, P. and Grant, C.A., "A Flexible Measurement Tool for Software Systems," Information Processing 71 (Proc. of the IFIP Congress), 1971, pp. 320-326.

Edjlali, G., et al., "History-based Access Control for Mobile Code," Fifth ACM Conference on Computer and Communication Security, Nov. 3-5, 1998, 19 pages.

Erlingsson, U. and Schneider, F. B., "SASI Enforcement of Security Policies: A Retrospective," Proc. New Security Paradigms Workshop, Apr. 2, 1999, pp. 1-17.

Erlingsson, U. and Schnieder, F. B., IRM Enforcement of Java Stack Inspection, [online], Feb. 19, 2000, [retrieved on Apr. 2, 2002]. Retrieved from the Internet: <URL: http://cs-tr.cs.cornell.edu/Dienst/UI2.0/Show Page/ncstrl.cornell/TR2000-1786>.

Evans, D. and Twyman, A., "Flexible Policy-Directed Code Safety," Proc. of 1999 IEEE Symposium on Security and Privacy, Oakland, CA, May 9-12, 1999, pp. 1-14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp. 34-45.

Pandey, R. and Hashii, B., "Providing Fine-Grained Access Control For Mobile Programs Through Binary Editing," Technical Report TR98 08, University of California, Davis, CA, 1998, pp. 1-22.

Ritchie, D. M., "The Evolution of the Unix Time-Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL:http://www.cs.virginia.edu~evans/cs551/saltzer/>.

Wahbe, R., et al., "Efficient Software-Based Fault Isolation," Proc. of the Symposium on Operating System Principles, 1993, 14 pages.

Goyal, Pawan et al., *Generalized Guaranteed Rate Scheduling Algorithms: A Framework*, IEEE/ACM Transactions, vol. 5, Issue: 4, Aug. 1997; pp. 561-571.

Keshav, S., *An Engineering Approach to Computer Networking: ATM Networks, the Internet, and the Telephone Network*, Reading, MA, Addison-Wesley, 1997, pp. vii-xi, 85-115, 209-355, 395-444.

Stevens, R. W., *UNIX Network Programming vol. 1 Networking APIs: Sockets and XTI*, Upper Saddle River, NJ, Prentice Hall, 1998, pp. v-xiv, 29-53, 85-110, 727-760.

Tanenbaum, A. S. and Woodhull, A. S., *Operating Systems: Design and Implementation*, Upper Saddle River, NJ, Prentice Hall, 1997, pp. vii-xiv, 1-46, 401-454.

Rubini, A., *LINUX Device Drivers*, Sebastopol, CA, O'Reilly & Associates, Inc., 1998, pp. v-x, 13-40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp. v-viii, 43-74.

Aho, A. V. and Ullman J. D., *Principles of Compiler Design*, Reading, MA, 1977, pp. vii-x, 359-362, 519-522.

Jonsson, J., "Exploring the Importance of Preprocessing Operations in Real-Time Multiprocessor Scheduling," *Proc. of the IEEE Real-Time Systems Symposium—Work-In-Progress session*, San Francisco, CA, Dec. 4, 1997, pp. 31-34.

Rusling, D. A., Processes, [online], [retrieved on Dec. 7, 1999]. Retrieved from the Internet: <URL:cebaf.gov/~saw/linux/tlk-html/node44.html>.

Rusling, D. A., Linux Processes, [online], [retrieved on Dec. 7, 1999]. Retrieved from the Internet www.cebaf.gov/~saw/linux/tlk-html/node45.html>.

Rusling, D. A., Identifiers, [online], [retrieved on Dec. 7, 1999]. Retrieved from the Internet: <URL:cebaf.gov/~saw/linux/tlk-html/node46.html>.

Rusling, D. A., Scheduling, [online], [retrieved on Dec. 7, 1999]. Retrieved from the Internet: <URL:cebaf.gov/~saw/linux/tlk-html/node47.html>.

Rusling, D. A., Scheduling in Multiprocessor Systems, [online], [retrieved on Dec. 7, 1999]. Retrieved from the Internet: <URL:cebaf.gov/~saw/linux/tlk-html/node48.html>.

Rusling, D. A., Files, [online], [retrieved on Dec. 7, 1999]. Retrieved from the Internet: <URL:cebaf.gov/~saw/linux/tlk-html/node49.html>.

Plummer, D. C., *An Ethernet Address Resolution Protocol—or —Converting Network Protocol Addresses to 48.bit Ethernet Address for Transmission on Ethernet Hardware*, Nov. 1982, [online], [retrieved on Jan. 17, 2000]. Retrieved from the Internet: <URL:http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999-Sep. 3, 1999. pp. 95-108.

Campbell, A. T. and Keshav, S., "Quality of Service in Distributed Systems," *Computer Communications 21*, 1998, pp. 291-293.

Bach, M. J., *The Design of the Unix® Operating System*, New Delhi, Prentice-Hall of India, 1989, pp. v-x, 19-37.

McDougall, R., et al., *Resource Management*, Upper Saddle River, NJ, Prentice Hall, 1999, pp. iii-xix, 135-191.

Rijsinghani, A., RFC 1624, May 1994, [online], [retrieved Feb. 2, 2000]. retrieved from the internet: <faqs.org/rfcs/rfc1624.html>.

Mallory, T and Kullberg, A., RFC 1141, Jan. 1990 [online], [retrieved Feb. 2, 2000]. retrieved from the Internet: <faqs.org/rfcs/rfc1141.html>.

Egevang, K. and Francis P., RFC 1631, May 1994 [online], [retrieved Feb. 2, 2000]. retrieved from the Internet: <URL: faqs.org/rfcs/rfc1631.html>.

Goyal, P. et al., "Start-time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the Internet: <URL:cs.cornell.edu/Info/Courses/Spring-97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," U.S. Appl. No. 09/452,286, filed Nov. 30, 1999.

Pending United States patent application entitled "Selective Interception of System Calls," U.S. Appl. No. 09/499,098, filed Feb. 4, 2000.

Pending United States patent application entitled "Dynamic Scheduling of Task Streams in a Multiple-Resource System to Ensure Task Stream Quality of Service," U.S. Appl. No. 09/498,450, filed Feb. 4, 2000.

Pending United States patent application entitled "Disambiguating File Descriptors," U.S. Appl. No. 09/500,212, filed Feb. 8, 2000.

Pending United States patent application entitled "Restricting Communication Between Network Devices on a Common Network," U.S. Appl. No. 09/502,155, filed Feb. 11, 2000.

Pending United States patent application entitled "Restricting Communication of Selected Processes to a Set of Specific Network Addresses," U.S. Appl. No. 09/503,975, filed Feb. 14, 2000.

Pending United States patent application entitled "Enabling a Service Provider to Provide Intranet Services," U.S. Appl. No. 09/526,980, filed Mar. 15, 2000.

Pending United States patent application entitled "Dynamically Modifying the Resources of a Virtual Server," U.S. Appl. No. 09/569,371, filed May 11, 2000.

Pending United States patent application entitled "Regulating File Access Rates According to File Type," U.S. Appl. No. 09/572,672, filed May 16, 2000.

Pending United States patent application entitled "Modifying Internal Components of a Running Operating System," U.S. Appl. No. 09/576,393, filed May 22, 2000.

Pending United States patent application entitled "Associating Identifiers With Virtual Processes," U.S. Appl. No. 09/611,877, filed Jul. 7, 2000.

Pending United States patent application entitled "Fairly Partitioning Resources While Limiting the Maximum Fair Share," U.S. Appl. No. 09/633,575, filed Aug. 7, 2000.

Pending United States patent application entitled "Intercepting I/O Multiplexing Operations Involving Cross-Domain File Descriptor Sets," U.S. Appl. No. 09/664,914, filed Sep. 18, 2000.

Pending United States patent application entitled "Virtualizing Port Addresses for Non-Conflicting Use by Multiple Virtual Processes," U.S. Appl. No. 09/679,396, filed Oct. 3, 2000.

Pending United States patent application entitled "Intercepting Calls to Non-Local Procedures," U.S. Appl. No. 09/687,031, filed Oct. 12, 2000.

Pending United States patent application entitled "Virtualizing Resource Ownership for Multiple Virtual Processes," U.S. Appl. No. 09/747,664, filed Dec. 22, 2000.

Symbol Table, [online] copyright 1997, 1998, [Retrieved on Apr. 4, 2003] Retrieved from the Internet <URL: 16.239.33.100/search?q=cache:eASXk8qC_-caldera.com/developers/gabi/1998-04-29/ch4.s..., pp. 1-5.

Mitra, Debasis et al., "Hierarchical Virtual Partitioning: Algorithms for Virtual Private Networking," Bell Labs Technical Journal, Spring, 1997, http://cm.bell-labs.com/cm/ms/who/mitra/papers/globe.ps.

Berkeley Software Distribution, "man page: setpgid", Feb. 1, 1994, [Retrieved on Oct. 13, 2005], Retrieved from the Internet <URL:http://www.neosoft.com/neosoft/man/setpgid.2.html>.

Berkeley Software Distribution, "man page: setsid", Feb. 1, 1994, [Retrieved on Oct. 13, 2005], Retrieved from the Internet <URL:http://www.neosoft.com/neosoft/man/setsid.2.html>.

Frost, J., "UNIX Signals and Process Groups", Aug. 17, 1994, [Retrieved on Oct. 13, 2005], Retrieved from the Internet <URL:http://www.cs.ucsb.edu/~almeroth/classes/W99.276/assignment1/signals.html>.

Stevens, Richard W., "Advanced Programming in the UNIX® Environment", 1993, pp. 237-246, 282-285, Addison Wesley Longman, Inc., USA.

\* cited by examiner

| Process identifier (PID) 201 | Virtual process identifier (VPID) 203 |
|---|---|
| 3942 | 1 |
| 6545 | 1 |
| 6823 | 1 |
| 4968 | 2 |
| 7654 | 2 |
| 8197 | 2 |

| User Identifier (UID) 305 | Virtual process identifier (VPID) 203 |
|---|---|
| 1223 | 1 |
| 2685 | 2 |
| 1001 | 3 |
| 8232 | 4 |
| 3964 | 5 |
| 4413 | 6 |

FIG. 14

VIRTUALIZING SUPER-USER PRIVILEGES FOR MULTIPLE VIRTUAL PROCESSES

BACKGROUND

1. Field of the Invention

The present invention relates generally to computer operating systems, and more particularly, to techniques for virtualizing super-user privileges in a computer operating system including multiple virtual processes, such as virtual private servers.

2. Description of the Background Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer would be desirable. In order to be commercially viable, however, every server application would need to be isolated from every other server application running on the same physical host. Clearly, it would be unacceptable to customers of an ISP to purchase hosting services, only to have another server application program (perhaps belonging to a competitor) access the customer's data and client requests. Thus, each server application program needs to be isolated, receiving requests only from its own clients, transmitting data only to its own clients, and being prevented from accessing data associated with other server applications.

Furthermore, it is desirable to allocate varying specific levels of system resources to different server applications, depending upon the needs of, and amounts paid by, the various customers of the ISP. In effect, each server application needs to be a "virtual private server," simulating a server application executing on a dedicated physical host computer.

Such functionality is unavailable on traditional server technology because, rather than comprising a single, discrete process, a virtual private server must include a plurality of seemingly unrelated processes, each performing various elements of the sum total of the functionality required by the customer. Because each virtual private server includes a plurality of processes, it has been impossible using traditional server technology for an ISP to isolate the processes associated with one virtual private server from those processes associated with other virtual private servers.

Accordingly, what is needed is a technique for associating a plurality of processes with a virtual process. What is also needed is a technique for associating an identifier with a virtual process.

One of the difficulties in providing isolation between virtual private servers within a single host computer involves resource ownership. In UNIX® and related operating systems, certain system resources, such as processes and files, are owned by users or groups of users. Each user is assigned a user identifier (UID) by which the user is identified in the operating system. In some cases, a group of users may be assigned a group identifier (GID).

Resource ownership is typically used to implement access control. For example, a user can generally only kill a process or access a file that he or she owns (or for which permission has been granted by the owner). Thus, if a user attempts, for instance, to kill a process that he or she does not own, the attempt fails and an error is generated.

An exception to the above is a special user, known as a "super-" or "root-" user. The super-user has access to all system resources and is typically a system administrator or the like. For example, the super-user can open, modify, or delete any system file and can terminate any system process.

Implementing resource ownership in the context of multiple virtual private servers presents a number of difficulties. Each virtual private server should be free to assign to an individual or group any UID or GID, respectively. Indeed, some applications require certain files or processes to be associated with a particular UID or GID in order to properly function.

Unfortunately, if two users of different virtual private servers share the same UID, one user could potentially kill the other user's processes and read, modify, or delete the other user's files. The same possibility is true for two groups sharing the same GID.

For example, one user could execute a "kill −1" command, which terminates all of =the processes associated with the user's UID. Unfortunately, if another user on the same computer shares the same UID, all of that user's processes will be terminated as well. Clearly, this is unacceptable in the context of a virtual private server, where each server should appear to be running on a dedicated host machine.

Accordingly, what is needed is a technique for virtualizing resource ownership in a computer operating system including multiple virtual private servers. Indeed, what is needed is a technique for allowing a virtual private server to assign any UID or GID to a user or group, without creating an unacceptable security risk or removing the appearance that the virtual private server is running on a dedicated host.

As noted above, in UNIX® and related operating systems, the super-user is granted special privileges not available to other users. For example, the super-user can open, modify, or delete the files of other users, as well as terminate other users' processes. Indeed, the super-user can add and delete users, assign and change passwords, and insert modules into the operating system kernel.

Implementing super-user privileges in a computer operating system including multiple virtual processes presents numerous difficulties. For example, each virtual process should be allowed to have a system administrator who has many of the privileges of a super-user, e.g., the ability to add and delete users of the virtual process, access files of any user of the virtual process, terminate processes associated with the virtual process, and the like.

However, if a user of each virtual process were given full super-user privileges, a super-user of one virtual process could access the files of a user of another virtual process. Similarly, a super-user of one virtual process could terminate the processes associated with a user of another virtual process. Indeed, a super-user of one virtual process could obtain exclusive access to all system resources, effectively disabling the other virtual processes. Clearly, allowing a user of each virtual process full super-user privileges would seriously compromise system security, entirely removing the illusion that the virtual processes are running on dedicated host computers.

Accordingly, what is needed is a technique for virtualizing super-user privileges in a computer operating system including multiple virtual processes. Moreover, what is needed is a technique for virtualizing super-user privileges, such that a virtual super-user has the power to perform traditional system administrator functions with respect to his or her own virtual process, but is unable to interfere with other virtual processes or the underlying operating system.

SUMMARY OF THE INVENTION

The present invention relates to virtualizing super-user privileges in a computer operating system including multiple virtual processes. In one aspect of the invention, a plurality of virtual super-users are designated, each virtual super-user being associated with a separate virtual process. A virtual super-user may be designated, in one embodiment, by assigning a virtual super-user identifier, which may comprise a super-user identifier and an indication of a virtual process. In an alternative embodiment, a virtual super-user may be designated by assigning a regular user identifier and storing that identifier in a virtual super-user list.

In another aspect of the invention, a system call wrapper intercepts a system call for which actual super-user privileges are required, which is nevertheless desirable for a virtual super-user to perform in the context of his or her own virtual process. In response to a determination that the intercepted system call was made by a virtual super-user and pertains to the virtual process of the virtual super-user, the virtual super-user is temporarily granted actual super-user privileges. The system call is then executed as though it were made by real super-user, after which the actual super-user privileges are withdrawn.

Thus, a virtual super-user has the power to perform traditional system administrator functions with respect to his or her own virtual process, but is unable to interfere with other virtual processes or the underlying operating system. Moreover, each virtual process may have a virtual super-user, while preserving the illusion that the virtual processes are running on dedicated host machines.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2 is a virtual process table;

FIG. 14 is a virtual super-user list; and

The Figures depict embodiments of the present invention for purposes of illustration only. Those skilled in the art will readily recognize from the following discussion that alternative embodiments of the illustrated structures and methods may be employed without departing from the principles of the invention described herein.

DETAILED DESCRIPTION OF THE PREFERRED EMBODIMENTS

The present invention relates to virtualizing super-user privileges in a computer operating system including multiple virtual processes. One example of a virtual process is a virtual private server, which simulates a server running on a dedicated host machine.

As previously noted, implementing a virtual private server using traditional server technologies has been impossible because, rather than comprising a single, discrete process, a virtual private server must include a plurality of seemingly unrelated processes, each performing various elements of the sum total of the functionality required by a customer. Moreover, isolating virtual private servers from each other presents a number of difficulties related to resource ownership.

Accordingly, one aspect of the present invention relates to a system and method for associating identifiers with virtual processes, as described immediately below. Thereafter, a system and method are described for virtualizing resource ownership in a computer operating system including multiple virtual processes. Finally, there is provided a detailed description of a system and method for virtualizing super-user privileges in a computer operating system including multiple virtual processes.

I. Associating Identifiers with Virtual Processes

Figure 1:
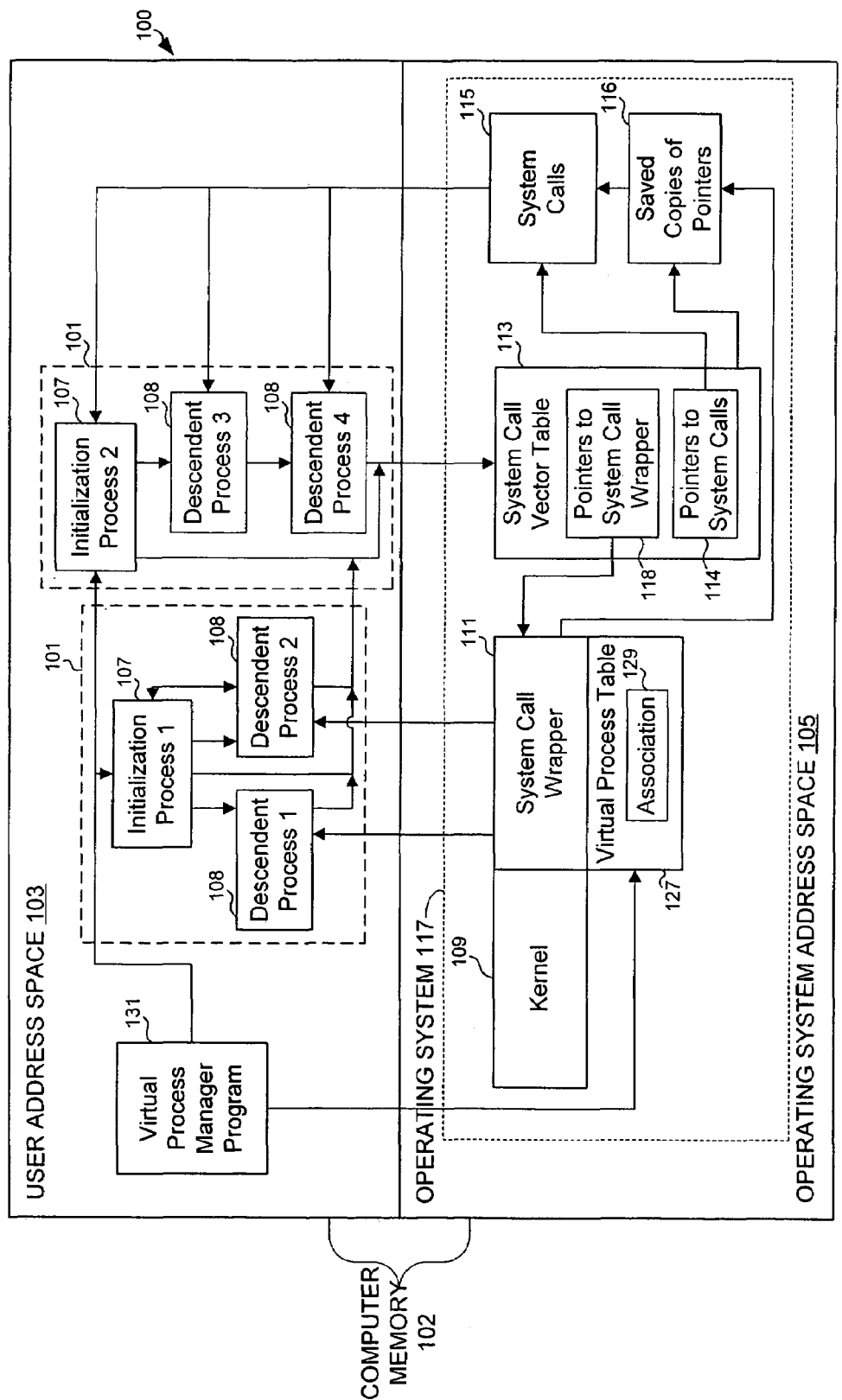
FIG. 1 is a block diagram of a system for associating identifiers with virtual processes.

FIG. 1 is a high-level schematic block diagram of a system 100 for associating identifiers with virtual processes 101 according to one embodiment of the present invention. A computer memory 102 includes a user address space 103 and an operating system address space 105. Multiple initialization processes 107 execute in the user address space 103. Although FIG. 1 illustrates only two initialization processes 107 executing in the user address space 103, those skilled in the art will understand that more than two initialization processes 107 can execute simultaneously within a given computer memory 102.

Also executing in the user address space 103 are one or more descendent processes 108 originating from the initialization processes 107. A descendent process 108 is a child process of an initialization process 107, or a child process thereof, extended to any number of generations of subsequent child processes. Although FIG. 1 illustrates only two descendent processes 108 for each initialization process 107, fewer or more than two descendent processes 108 per initialization process 107 can execute simultaneously within a given computer memory 102.

In one embodiment, a virtual process table 127 or other suitable data structure for storing associations 129 between executing processes 107, 108 and virtual processes 101 is inserted into the operating system 117. Of course, other data structures may be used to store associations 129, one example of which is a linked list.

In various embodiments, the virtual process table 127 (or other data structure) is dynamically loaded into the operating system kernel 109 while the kernel 109 is active. In another embodiment, the virtual process table 127 is stored in the user address space 103. The maintenance and use of the virtual process table 127 is discussed in detail below.

Those skilled in the art will recognize that a virtual process 101 is not an actual process that executes in the computer memory 102. Instead, the term "virtual process" describes a collection of associated functionality. For example, a virtual process 101 is not actually a discrete process, but instead, comprises a plurality of actual processes that together provide the desired functionality, thereby simulating the existence of a single application executing on a dedicated physical host. Each actual process that performs some of the functionality of the application is a part of the virtual process 101. As shown in FIG. 1, for example, initialization process 1 and descendent processes 1 and 2 together comprise one virtual process 101, whereas initialization process 2 and descendent processes 3 and 4 together comprise another.

As illustrated in FIG. 2, the virtual process table 127 stores, in one embodiment, an association 129 between a process identifier (PID) 201 and a virtual process identifier (VPID) 203. For example, the virtual process table 127 may store an association between a PID 201 of initialization process 1 (e.g., 3942) and a VPID 203 (e.g., 1). Likewise, an association 129b may be stored between a PID 201 of descendent process 1 (e.g., 6545), and the same VPID 203 (e.g., 1). Thus, initialization process 1 and descendent process 1 are said to be members of the same virtual process 101.

In order to associate a specific identifier with each actual process that is a member of a virtual process 101, a separate system initialization process 107 is started for each virtual process 101. Normally, each process executing on a multi-tasking operating system such as UNIX® is descended from a single system initialization process 107 that is started when the operating system 117 is booted. However, the system 100 uses techniques described in detail below to start a separate system initialization process 107 for each virtual process 101. When each system initialization process 107 is started, an association 129 between the system initialization process 107 and the virtual process 101 is stored in the virtual process table 127. All additional processes that are descended from a given initialization process are thus identified with the virtual process 101 associated with that initialization process.

In one embodiment, rather than starting a separate system initialization process 107 for each virtual process 101, a custom initialization process is started. In this embodiment, all processes that are members of a specific virtual process 101 are descended from the associated custom initialization process, and are associated with the virtual process 101 with which the custom initialization process is associated. The exact functionality included in the custom initialization process is a design choice that can be made by, for example, a system administrator.

System calls 115 that generate child processes (e.g., the UNIX® fork( ) and clone( ) functions) are intercepted so that the child processes can be associated with the virtual process 101 with which the parent process is associated. In one embodiment, a system call wrapper 111 is used to intercept system calls 115. In one embodiment, the wrapper 111 is dynamically loaded into the operating system kernel 109 while the kernel 109 is active. In another embodiment, the system call wrapper 111 is loaded into the user address space 103.

Pointers 114 to the system calls 115 are located in an operating system call vector table 113. Those skilled in the art will recognize that the term "system call vector table," as used herein, denotes an area in the operating system address space 105 in which addresses of system calls are stored. In the UNIX® operating system, this part of the operating system is called the "system call vector table," and that term is used throughout this description. Other operating systems employ different terminology to denote the same or similar system components. The pointers 114, themselves, are sometimes referred to as "system call vectors."

A copy 116 is made of a pointer 114 to each system call 115 to be intercepted. These copies 116 of pointers 114 may be stored in the operating system address space 105, but in an alternative embodiment, are stored in the user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead.

In one embodiment, the system call wrapper 111 performs the process of copying, storing, and replacing of pointers. In other embodiments, the process of copying, storing, and replacing of pointers is performed by a pointer management module (not shown) executing in either the operating system address space 105 or the user address space 103, as desired. The pointer management module may either be a stand alone program or a component of a larger application program.

By intercepting a system call 115, alternative code is executed. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

In one embodiment, only the system calls 115 that create child processes need be intercepted, and thus only the pointers 114 to the system calls 115 to be intercepted are replaced with the pointers 118 to the system call wrapper 111. The pointers 114 to the system calls 115 which are not to be intercepted are not replaced. Thus, when a non-intercepted system call 115 is made, the actual system call 115 executes, not the system call wrapper 111.

The various initialization processes 107 and descendent processes 108 execute in the user address space 103 under control of the operating system 117 and make system calls 115. When a process makes a system call 115 that creates a child process, the system call wrapper 111 reads the virtual process table 127, and determines whether the process that made the system call (the parent of the child process being created) is associated with a virtual process 101. If so, the system call wrapper 111 uses the saved copy of the pointer 116 to execute the system call 115, allowing the creation of the child process.

The system call wrapper 111 then updates the virtual process table 127, storing an association 129 between the newly created child process and the virtual process 101 with which the process that made the system call is associated. Thus, all descendent processes 108 are associated with the virtual process 101 with which their parent process is associated.

In one embodiment, the initialization processes 107 are started by a virtual process manager program 131 executing in the user address space 103. The virtual process manager program 131 modifies the operating system 117 of the computer to include the virtual process table 127. In one embodiment, the manager program 131 loads the virtual process table 127 into the kernel 109 of the operating system 117 while the kernel is active.

For each virtual process 101, the manager program 131 starts an initialization process 107 from which all other processes that are part of the virtual process 101 will originate as descendent processes 108. Each time the manager program 131 starts an initialization process 107 for a virtual process 101, the manager program 131 stores, in the virtual process table 127, an association 129 between the initialization process 107 and the appropriate virtual process 101. Subsequently, all additional processes that are part of the virtual process 101 will be originated from the initialization process, and thus associated with the appropriate virtual process 101.

For example, in this embodiment, the manager program 131 can start a first virtual process 101. To do so, the manager program 131 starts an initialization process 107 for the virtual process 101, storing an association 129 between the initialization process 107, and a virtual process identifier for the virtual process 101. Additional processes that are part of the virtual process 101 originate from the initialization process 107, and are associated with the virtual process identifier of the virtual process 101. The manager program 131 can proceed to start a second virtual process 101 by starting a separate initialization process 107, and associating the second initialization process 107 with a separate virtual process identifier for the second virtual process 101. Consequently, all of the processes associated with the second virtual process 101 will be associated with the appropriate virtual process identifier. In this manner, multiple virtual processes 101 on the same physical computer are each associated with unique identifiers.

In an alternative embodiment, the virtual process manager program 131 can be implemented as a modified loader program. A loader program is an operating system utility that is used to execute computer programs that are stored on static media. Typically, a loader program loads an executable image from static media into the user address space 103 of the computer memory 102, and then initiates execution of the loaded image by transferring execution to the first instruction thereof.

Like a standard loader program, a modified loader program loads executable images (in this case, initialization processes 107) from static media into the user address space 103. Additionally, the modified loader program stores, in the virtual process table 127, an association 129 between the initialization process 107 being loaded and the appropriate virtual process 101. Thus, for each virtual process 101, an initialization process 107 is loaded by the modified loader program, and an association between the initialization process 107 and the virtual process 101 is stored in the virtual process table 127. Subsequently, additional processes that are part of the virtual process 101 originate from the associated initialization process 107, and are thus associated with the virtual process 101, as described above.

In another embodiment, the modified loader program loads all processes that are part of each virtual process 101. In that embodiment, whenever the modified loader program loads a process, the modified loader program also stores, in the virtual process table 127, an association 129 between the loaded process and the appropriate virtual process 101.

II. Virtualizing Resource Ownership

Figure 3:
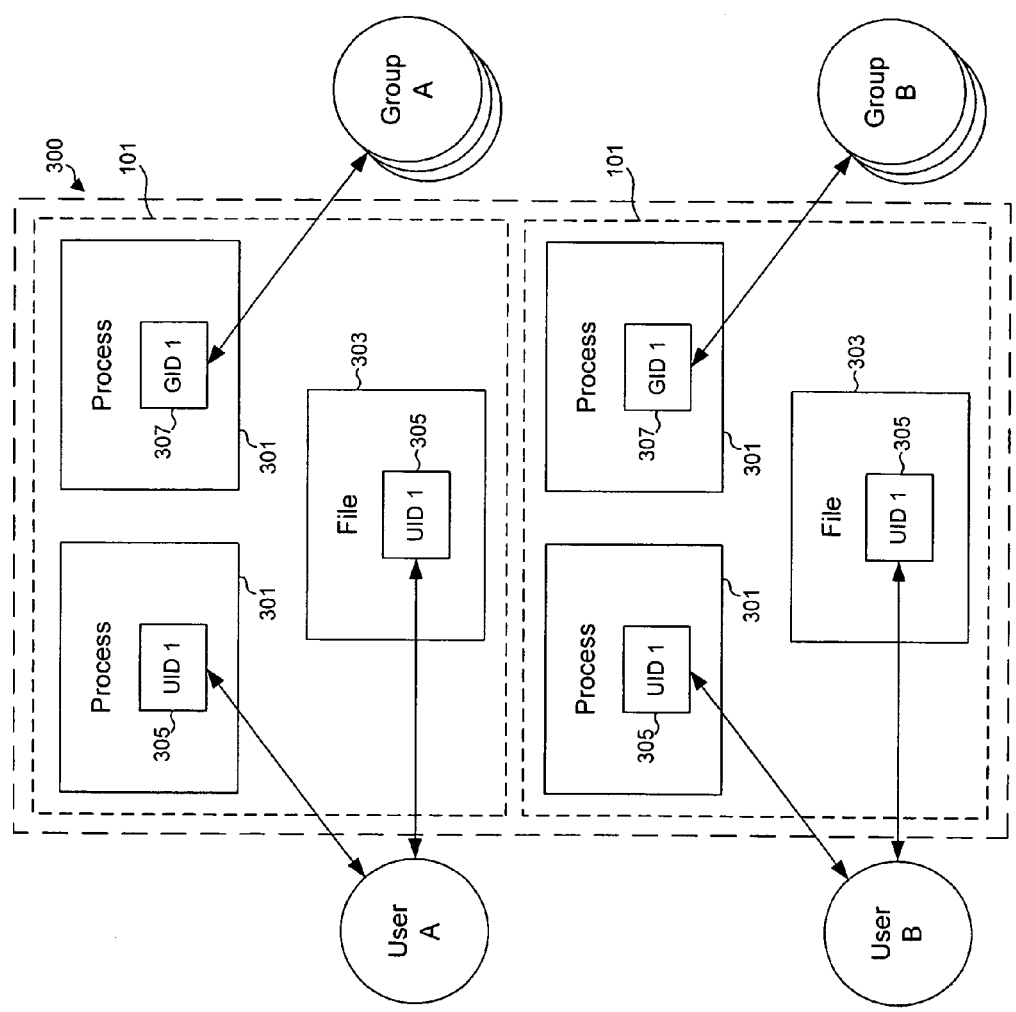
FIG. 3 is a block diagram of a plurality of virtual processes.

As illustrated in FIG. 3, one of the difficulties in providing isolation between virtual processes 101 (e.g., virtual private servers) within a single host system 300 involves resource ownership. In UNIX® and related operating systems 117, certain system resources, such as processes 301 and files 303, are owned by users or groups of users. Each user is assigned a user identifier (UID) 305 by which the user is identified in the operating system 117. In some cases, a group of users may be assigned a group identifier (GID) 307. The UID 305 and GID 307 are sometimes referred to herein as "owner identifiers."

Resource ownership is typically used to implement access control. For example, a user can generally only kill a process 301 or access a file 303 that he or she owns (or for which permission has been granted by the owner). Thus, if a user attempts, for instance, to kill a process 301 that he or she does not own, the attempt fails and an error is generated.

A difficulty arises, however, in implementing resource ownership for multiple virtual processes 101 running on the same host system 300. Each virtual process 101 should be free to assign to an individual or group any UID 305 or GID 307, respectively. Indeed, some applications require certain processes 301 or files 303 to be associated with a particular UID 305 or GID 307 in order to properly function.

However, if two users of different virtual processes 101 share the same UID 305, those users could potentially kill each other's processes 301 and read, modify, or delete each other's files 303. The same is true for two groups sharing the same GID 307.

For instance, one user could execute a "kill −1" command, which terminates all of the processes 301 associated with the user's UID 305. Unfortunately, if another user on the same computer has the same UID 305, all of that user's processes 301 will be terminated as well. Clearly, this poses an unacceptable security risk and removes the appearance that the virtual process 101 is running on a dedicated physical host.

In accordance with the present invention, resource ownership is virtualized to allow a user of one virtual process 101 to appear to have the same UID 305 as a user of another virtual process 101, although neither user is capable of interfering with the processes 301 or accessing the files 303 of the other. Likewise, in accordance with the present invention, a group of users of one virtual process 101 may appear to share the same GID 307 with a group of users of another virtual process 101.

Figure 4:
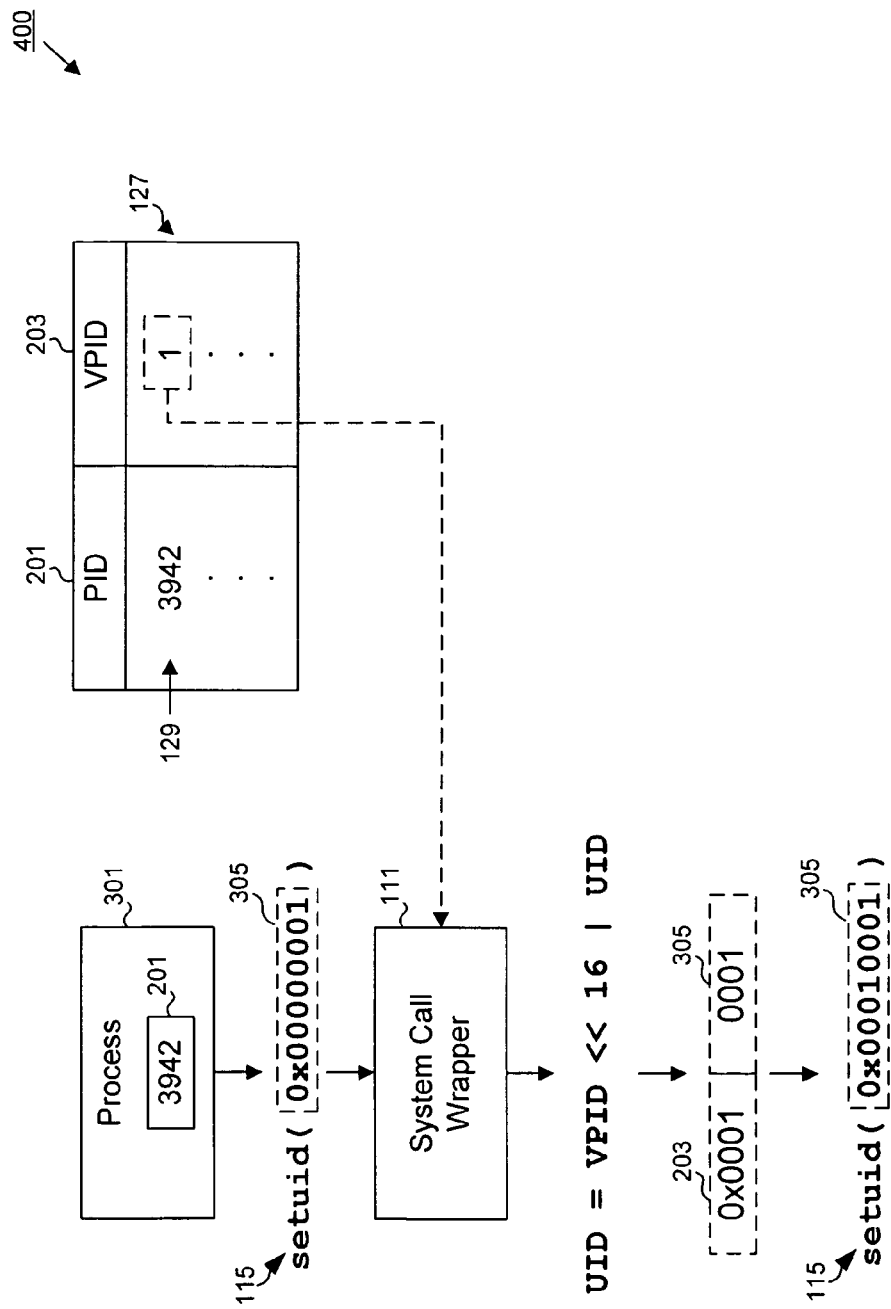
FIG. 4 is a block diagram of a system for virtualizing resource ownership.

FIG. 4 illustrates a system 400 for virtualizing resource ownership. In one embodiment, a system call wrapper 111 intercepts a system call 115 for setting the UID 305 or GID 307 associated with a resource (such as a process 301 or file 303). In the case of UNIX®, for instance, the setuid( ) and setgid( ) functions are used to associate a UID 305 and GID 307, respectively, with a calling process 301. Similarly, the UNIX® chown( ) function is used to associate a UID 305 or GID 307 with a file 303. Of course, the invention is not restricted to any particular terminology or operating system.

A technique for intercepting system calls 115 was described above with reference to FIG. 1. As noted, pointers 114 to the system calls 115 to be intercepted can be copied and then replaced with pointers 118 to a system call wrapper 111. Thus, when the calls 115 are made, the system call wrapper 111 is executed instead.

For clarity, the following description often refers simply to the UID 305. However, the techniques and structures disclosed herein may also be used for system calls 115 involving GIDs 307, e.g., the UNIX® setgid( ) and chown( ) functions.

After the system call 115 is intercepted, the wrapper 111 determines a virtual process 101 corresponding to the calling process 301. The virtual process 101 is determined, in one implementation, by accessing the virtual process table 127, as described above, which stores associations 129 between processes 301 (e.g., PID 201) and virtual processes 101 (e.g., VPID 203).

Next, the wrapper 111 modifies the UID 305 specified in the intercepted call 115. In one implementation, the UID 305 is modified by encoding therein an indication of the virtual process (e.g., VPID 203). For instance, in the case of Solaris®, a version of UNIX®, the UID 305 is a 32 bit word. In one embodiment, the UID 305 is divided into two 16 bit portions. As described in detail below, the VPID 203 is encoded within the upper 16 bits of the UID 305, while the lower 16 bits are used to store the original data from the UID 305.

In the illustrated embodiment, the VPID 203 is encoded within UID 305 according to the equation:

$$UID = VPID << 16 | UID \qquad \text{Eq. 1}$$

where UID is the UID 305, VPID is the VPID 203 (from the table 127), and "<<" and "|" are the left shift and logical "OR" operators, respectively. In other words, the VPID 203 is left shifted 16 bits and then logically ORed with the UID 305.

Those skilled in the art will recognize that the above-described technique limits the number of unique UIDs 305 and virtual processes 101 to 65536, respectively. In alternative embodiments, however, the relative location and/or number of bits allocated to the VPID 203 within the UID 305 may vary, resulting in different limitations.

After the UID 305 is modified, the system call wrapper 111 associates the resource with the modified UID 305. This may be accomplished, in one embodiment, by executing the system call 115 by the wrapper 111, specifying the modified UID 305. In an alternative embodiment, the system call wrapper 111 can include its own code for setting the UID 305.

Consequently, from a standpoint of the calling process 301, the resource is associated with the UID 305 specified in the system call 115. From a standpoint of the operating system 117, however, the resource is actually associated with the modified UID 305.

FIG. 4 provides an example of the above-described technique. Suppose that a process 301 having a PID 201 of 3942 attempts to execute the UNIX® setuid( ) system call 115 with a specified UID 305 of 1. As shown, the system call wrapper 111 uses the virtual process table 127 to determine the VPID 203 (e.g., 1) associated with the calling process 301. The VPID 203 is then encoded within UID 305 as described above, resulting in a modified UID 305 having a hexadecimal value of 0x00010001 (65537 in decimal). Accordingly, the calling process 301 is associated with a UID 305 of 65537 rather than the specified UID 305 of 1.

Figure 5:
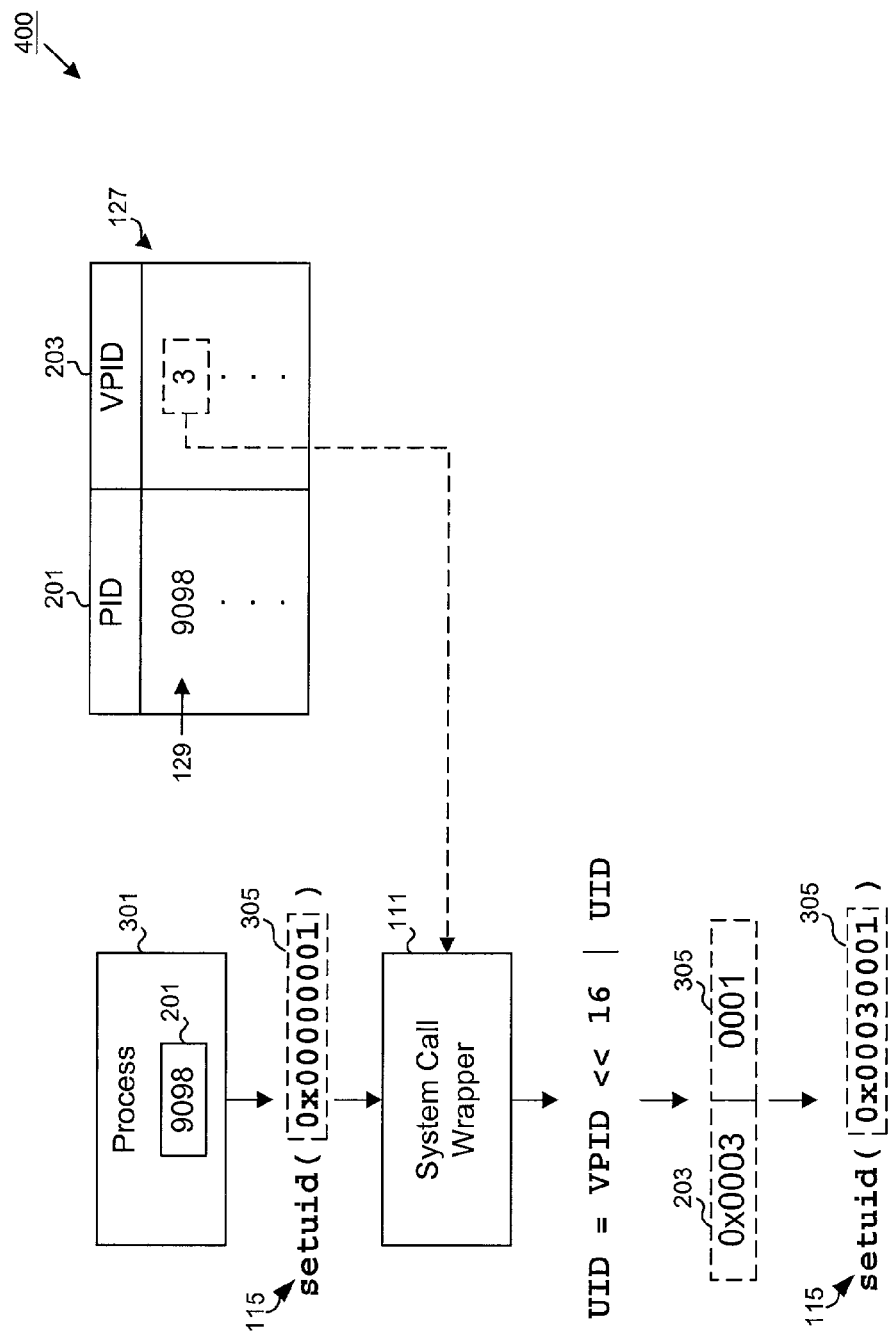
FIG. 5 is a block diagram of a system for virtualizing resource ownership.

As shown in FIG. 5, a different UID 305 will result from a different VPID 203. For instance, suppose that the VPID 203 of the virtual process 101 of FIG. 5 has a value of 3. Applying the above-described equation, the resulting modified UID 305 has a hexadecimal value of 0x00030001 (196609 in decimal). Accordingly, the calling process 301 is associated with a UID 305 of 196609 rather than the original UID 305 of 1 or the modified UID 305 of 65537 from the previous example.

Figure 6:
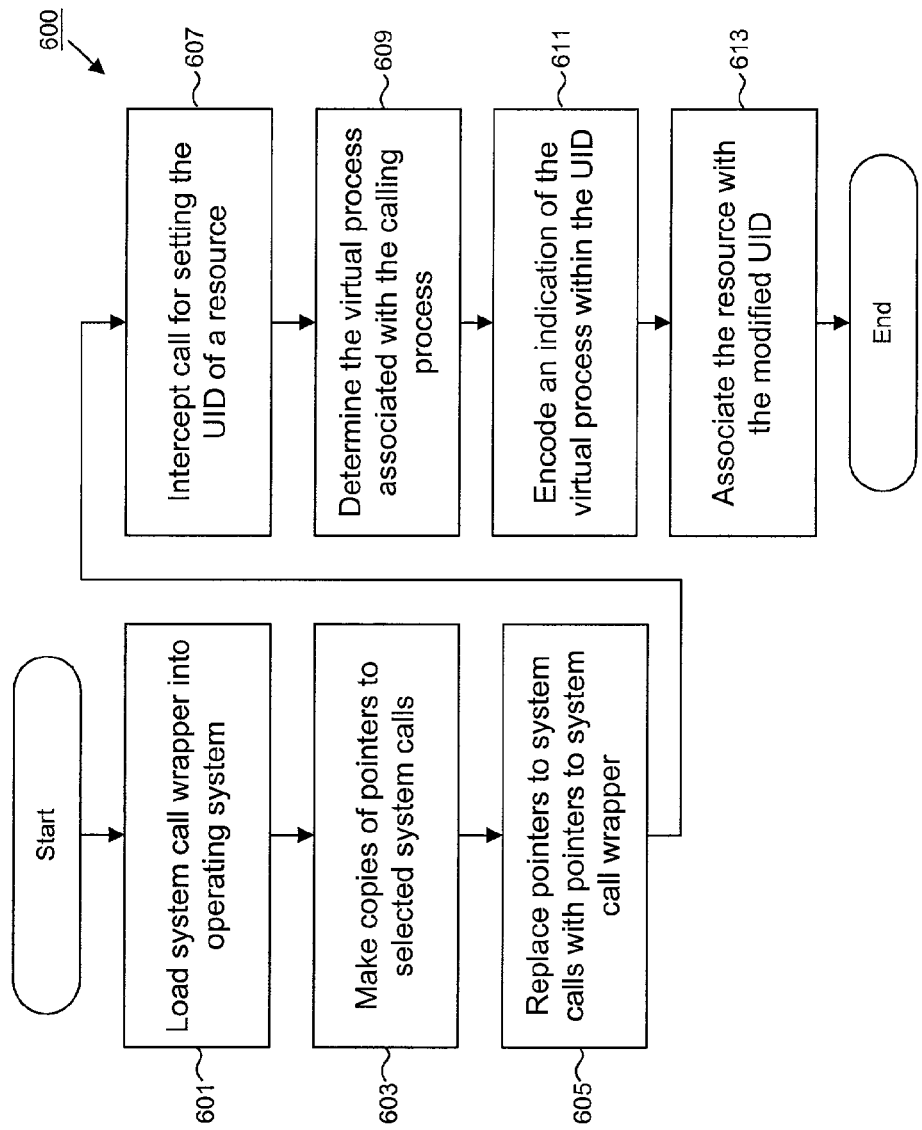
FIG. 6 is a flowchart of a method for virtualizing resource ownership.

The above-described technique for virtualizing resource ownership is summarized in FIG. 6. A method 600 begins in one embodiment by loading 601 a system call wrapper 111 into the operating system 117. Thereafter, copies are made 603 of pointers 114 to selected system calls 115 to be intercepted (e.g., setuid( ), setgid( ), and chown( )). The pointers 114 are then replaced 605, in one implementation, by pointers 118 to the system call wrapper 111. Thus, when one of the selected system calls 115 is made, the system call wrapper 111 is executed instead.

A system call 115 for setting the UID 305 of a resource is then intercepted 607. Next, the system call wrapper 111 determines 609 the virtual process 101 corresponding to the calling process 301. In one embodiment, this determination is made by referencing the virtual process table 127, as described above.

After the virtual process 101 is determined, the system call wrapper 111 encodes 611 an indication of the virtual process 101 (e.g., the VPID 203) within the UID 305. The wrapper 111 then associates 613 the resource with the modified UID 305. In one implementation, this is accomplished by executing the system call 115 within the wrapper 111, specifying the modified UID 305.

Another aspect of virtualizing resource ownership involves intercepting system calls 115 for obtaining the UID 305 or GID 307 associated with a system resource. In the case of UNIX®, the getuid( ) function returns the UID 305 associated with the calling process 301. Similarly, the UNIX® getgid( ) function returns the GID 307. Additionally, the UNIX® stat( ) function returns the UID 305 and/or GID 307 associated with a file 303. Of course, the invention is not limited to any particular terminology or operating system 117.

Consequently, if a system call 115 for obtaining a UID 305 (e.g., getuid( )) were allowed to execute without modification, the calling process 301 would receive a "modified" UID 305, such as a UID 305 including an indication of a virtual process 101. From the standpoint of the calling process 301, the UID 305 would be unexpected, with unpredictable results.

Figure 7:
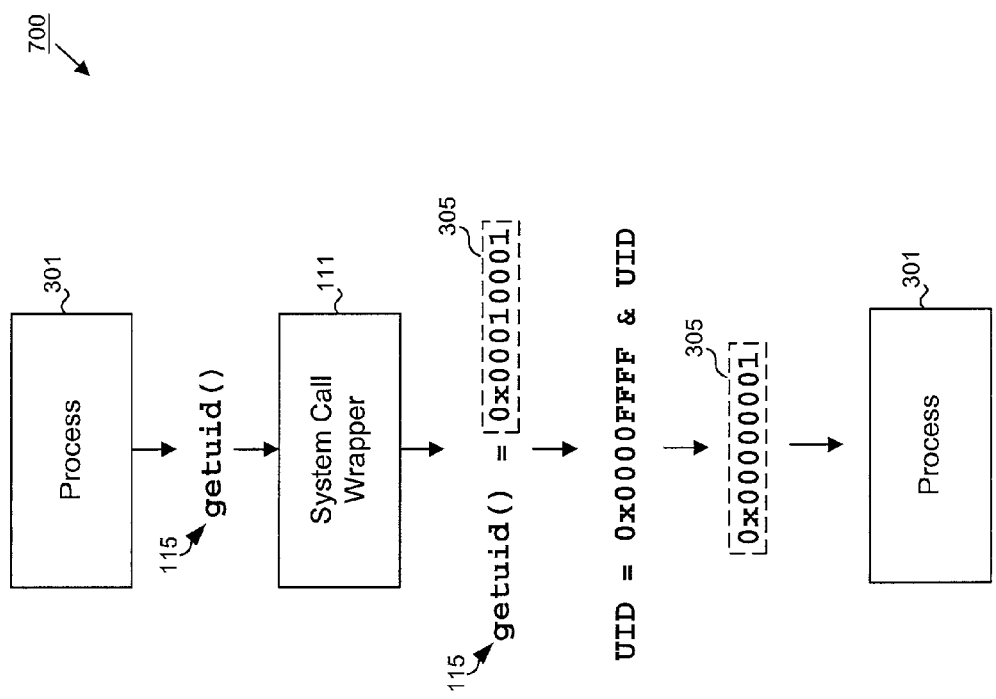
FIG. 7 is a block diagram of a system for virtualizing resource ownership.

Thus, FIG. 7 illustrates a system 700 for virtualizing resource ownership. After intercepting one of the above-identified system calls 115, the system call wrapper 111 obtains the UID 305 from the standpoint of the operating system 117. The wrapper 111 obtains the UID 305, in one embodiment, by executing the system call 115. In alternative embodiments, the wrapper 111 may include its own code for obtaining the UID 305.

In one embodiment, the UID 305 obtained by the wrapper 111 includes an indication of the virtual process 101 (e.g., VPID 203). Thus, the wrapper 111 removes the VPID 203 to restore the original, unmodified UID 305, as described in greater detail below.

As previously explained, a UID 305 in Solaris® is a 32 bit word. In one implementation, the upper 16 bits are used to encode the VPID 203, while the lower 16 bits are used to store the UID data. Thus, the VPID 203 may be removed from the UID 305 by applying the equation:

$$UID = \text{0x0000FFFF} \ \& \ UID \qquad \text{Eq. 2}$$

where UID is the UID 305 and "&" is the logical "AND" operator. In other words, the set of bits corresponding to the VPID 203 within the UID 305 are cleared. Of course, the encoding of the VPID 203 may vary in alternative embodiments, necessitating a different equation.

An example of the above-described process is shown in FIG. 7. Suppose that a process 301 executes the UNIX® getuid( ) system call 115, which is intercepted by the system call wrapper 111. The wrapper 111 obtains the UID 305 (e.g., 0x00010001) associated with the resource by executing, for example, the system call 115. As illustrated, the upper 16 bits of the UID 305 include an indication of a virtual process 101 (e.g., a VPID 203 of 1).

The wrapper 111 then removes the indication of the virtual process 101 by logically ANDing the UID 305 with a value configured to clear the bits associated with the VPID 203, (e.g., 65535). As a result, a UID 305 of 1 is returned to the calling process 301, rather than the UID 305 of 65537.

Figure 8:
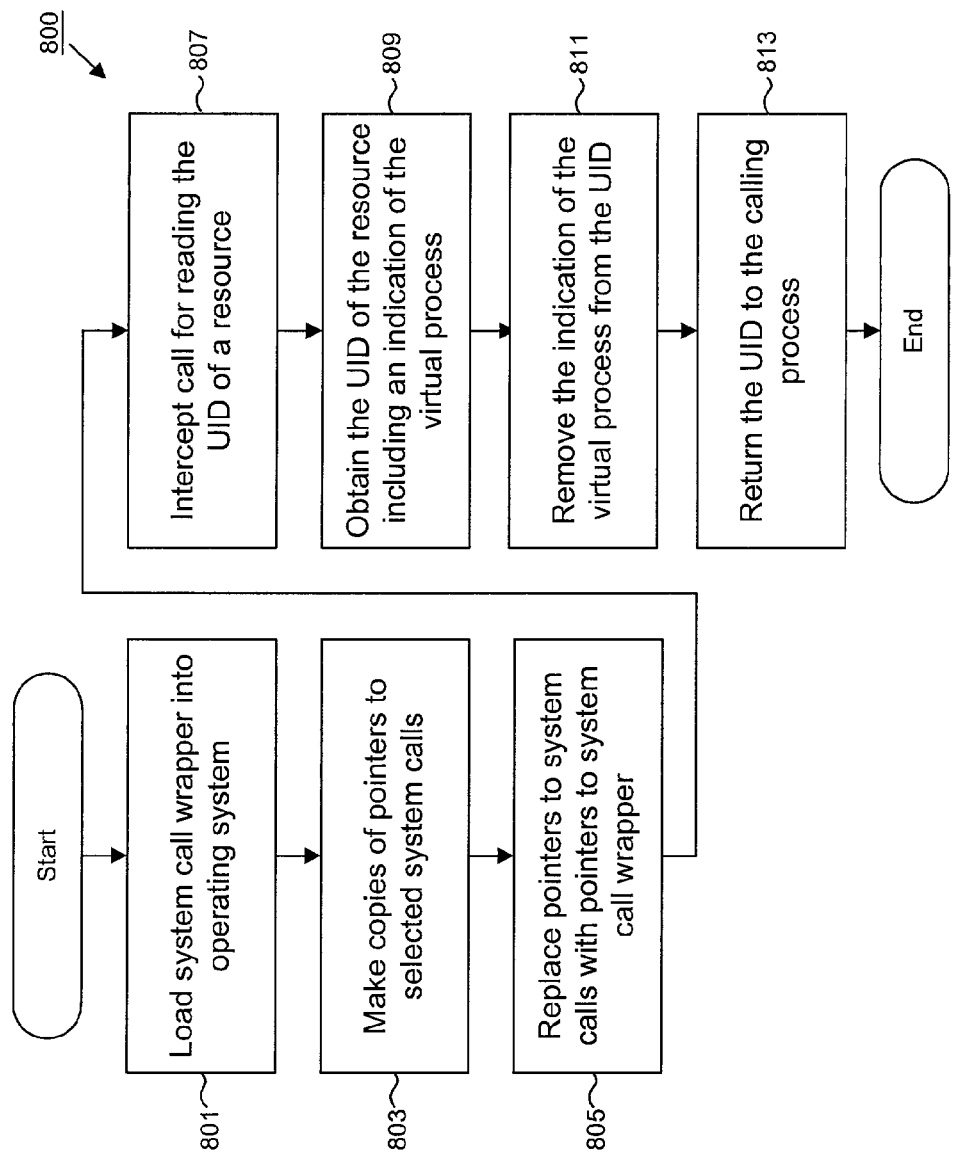
FIG. 8 is a flowchart of a method for virtualizing resource ownership.

The above-described technique for virtualizing resource ownership is summarized in FIG. 8. A method 800 begins in one embodiment by loading 801 a system call wrapper 111 into the operating system 117. Thereafter, copies are made 803 of pointers 114 to selected system calls 115 to be intercepted (e.g., getuid( ), getgid( ), and stat ( )). The pointers 114 are then replaced 805, in one implementation, by pointers 118 to the system call wrapper 111. Thus, when one of the selected system calls 115 is made, the system call wrapper 111 is executed instead.

A system call 115 for obtaining the UID 305 associated with a resource is then intercepted 807. Next, the system call wrapper 111 obtains 809 the UID 305 associated with the resource. In one embodiment, the wrapper 111 obtains the UID 305 by executing the system call 115. As noted, the UID 305 includes, as a consequence of the method 600 of FIG. 6, an indication of a virtual process 101 (e.g., VPID 203).

After the UID 305 is obtained, the system call wrapper 111 removes 811 the VPID 203 by logically ANDing the UID 305 with an appropriate value, e.g., 65535. The UID 305 is then returned 813 to the calling process 301.

Figure 9:
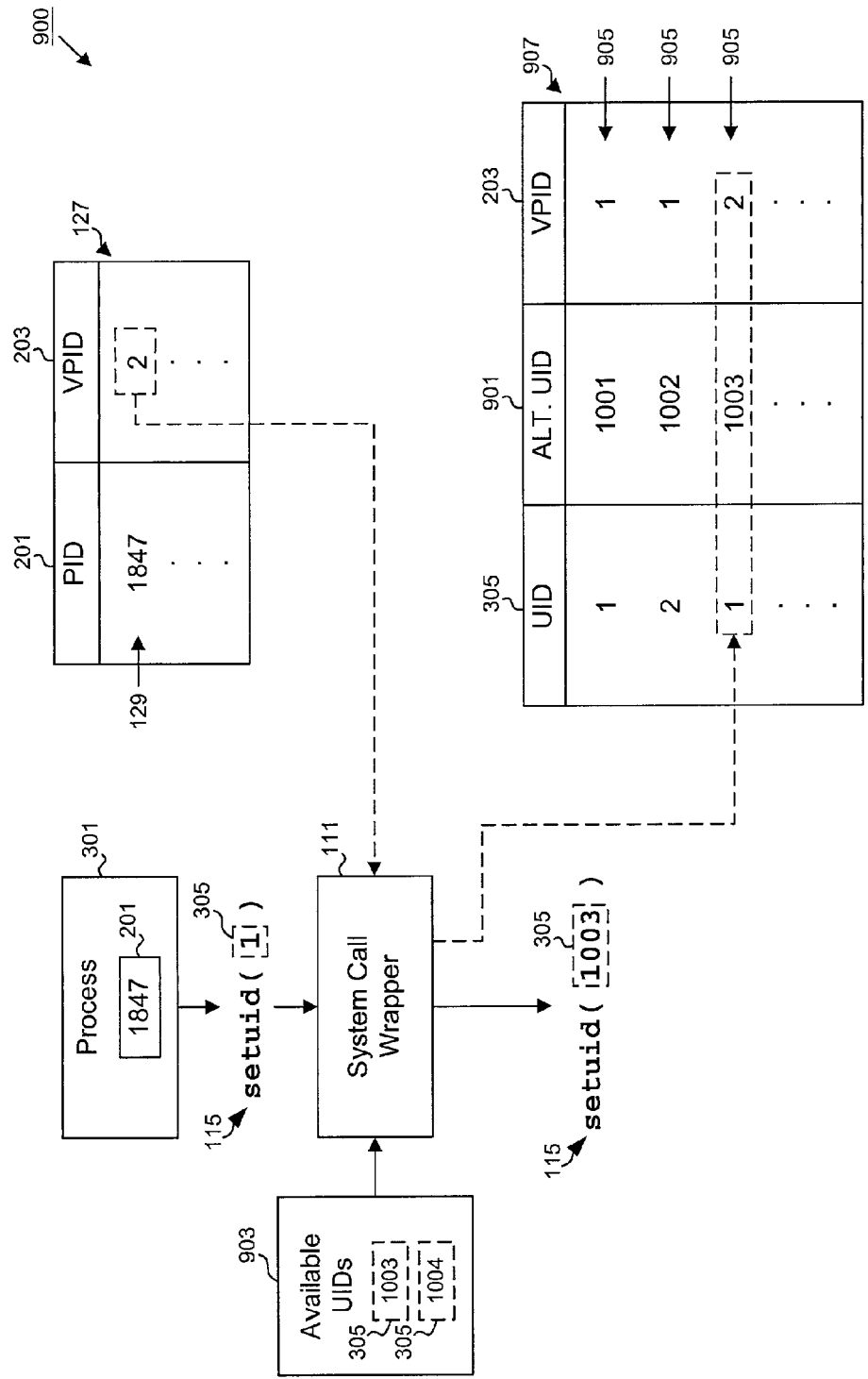
FIG. 9 is a block diagram of a system for virtualizing resource ownership.

FIG. 9 illustrates an alternative system 900 for virtualizing resource ownership. In an alternative embodiment, an indication of the virtual process 101 is not encoded within the UID 305. Rather, after a system call 115 for setting a UID 305 is intercepted, the system call wrapper 111 selects an alternative UID 901 from a set 903 of available (unused) UIDs 305. The set 903 may be implemented using any suitable data structure, such as a table or linked list. The alternative UID 901 may be selected using any convenient method, such as selecting the next available UID 305 in the set 903.

Once the alternative UID 901 is selected, the wrapper 111 creates an association 905 in a translation data structure 907 between the UID 305 specified in the call 115, the alternative UID 901 selected by the wrapper 111, and an indication of the virtual process 101 (e.g., VPID 203), which may be obtained by the wrapper 111 from the virtual process table 127.

After the translation data structure 907 is updated, the wrapper 111 associates the resource with the alternative UID 901. This is accomplished, in one embodiment, by executing the system call 115, specifying the alternative UID 901.

FIG. 9 provides an example of the above-described technique. Suppose that a process 301 having a PID 201 of 1847 attempts to execute the UNIX® setuid( ) system call 115 with a specified UID 305 of 1. As illustrated, the system call wrapper 111 intercepts the call 115 and uses the virtual process table 127 to determine the virtual process 101 (e.g., VPID 203) associated with the calling process 301.

The system call wrapper 111 then selects an alternative UID 901 (e.g., 1003) from a set 903 of available UIDs 305. Thereafter, the wrapper 111 creates an association 905 in the translation data structure 907 between the UID 305 specified in the call 115 (e.g., 1), the alternative UID 901 (e.g., 1003), and the VPID 203 (e.g., 2). Once the translation data structure 907 is updated, the wrapper 111 associates the calling process 301 with the alternative UID 901 by executing, for example, the system call 115.

Figure 10:
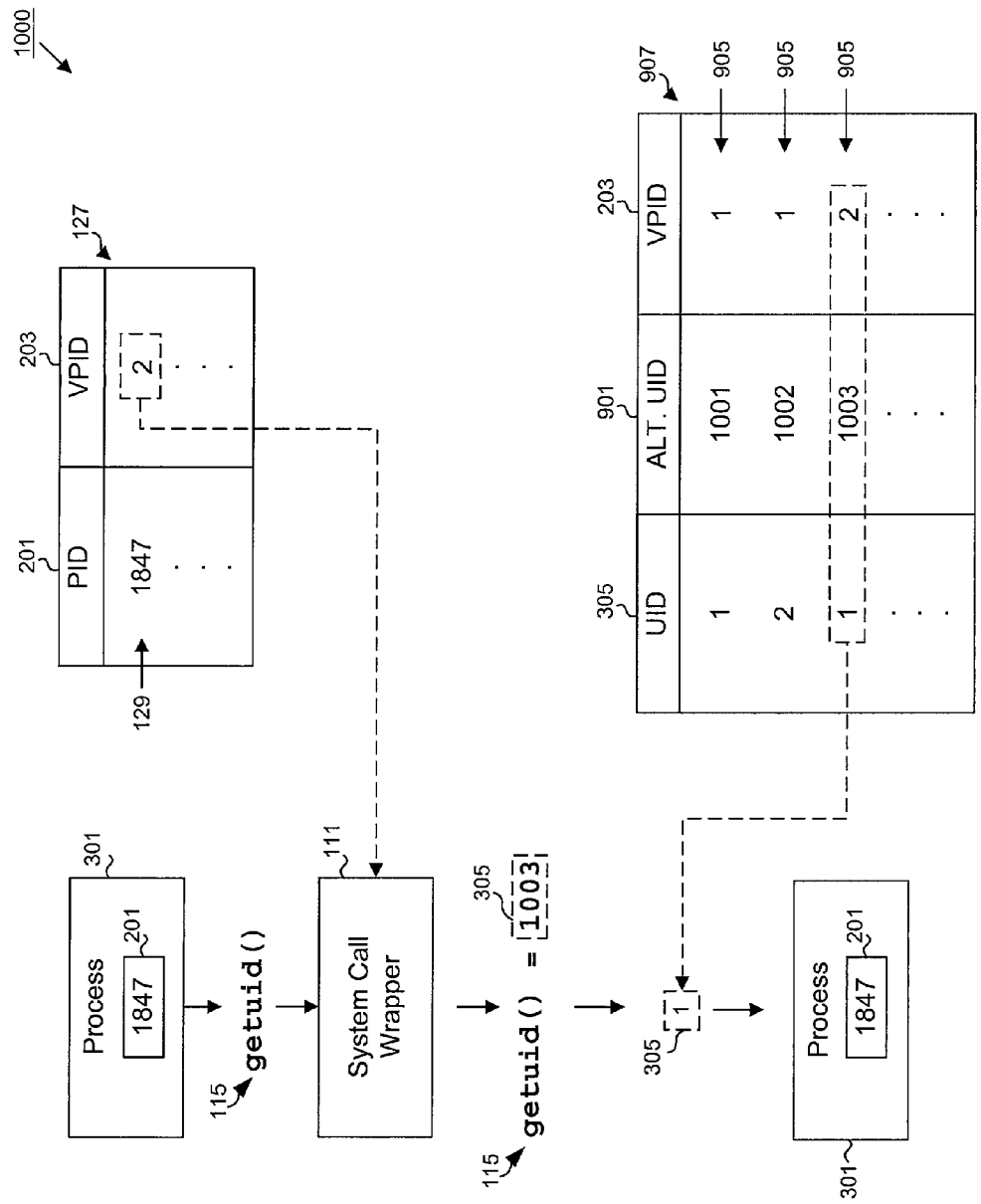
FIG. 10 is a block diagram of a system for virtualizing resource ownership.

FIG. 10 illustrates a corresponding system 1000 for intercepting system calls 115 for obtaining the UID 305 or GID 307 associated with a resource. Initially, the system call wrapper 111 intercepts the call 115 (e.g., getuid( ), getgid( ), and stat( )). Thereafter, the wrapper 111 determines the virtual process 101 (e.g., VPID 203) associated with the calling process 301 using a virtual process table 127 or the like.

The system call wrapper 111 then obtains the alternative UID 901 associated with the resource by executing, for example, the system call 115. As described above, the alternative UID 901 is associated with the resource as a consequence of the system 900 illustrated in FIG. 9.

After the alternative UID 901 is obtained, the wrapper 111 accesses the translation data structure 907, looking up the alternative UID 901 and the VPID 203. When an association 905 is found, the corresponding UID 305 is retrieved from the translation data structure 907 and returned to the calling process 301.

An example of the above-described process is shown in FIG. 10. Suppose that a process 301 executes the getuid( ) function, which is intercepted by the system call wrapper 111. In one embodiment, the wrapper 111 executes the getuid( ) function, which returns an alternative UID 901 of 1003. The wrapper 111 also determines the VPID 203 (e.g., 2) associated with the calling process 301 by accessing the virtual process table 127.

The wrapper 111 then accesses the translation data structure 907, looking up an alternative UID 901 of 1003 and a VPID 203 of 2. As illustrated, an association 905 exists, revealing a UID 305 of 1, which is subsequently returned to the calling process 301.

III. Virtualizing Super-User Privileges

As noted above, in UNIX® and related operating systems, the "super-user" is granted special privileges not available to other users. For example, the super-user can open, modify, or delete the files of other users, as well as terminate other users' processes. Indeed, the super-user can add and delete users, assign and change passwords, and insert modules into the operating system kernel 109.

Implementing super-user privileges in an operating system 117 including multiple virtual processes 101 presents numerous challenges. For example, each virtual process 101 should be allowed to have a user who is granted super-user-like powers, e.g., the ability to add and delete users of the virtual process 101, access files 303 of any user of the virtual process 101, terminate processes 301 associated with the virtual process 101, and the like.

However, if a user of each virtual process 101 were given full super-user privileges, a super-user of one virtual process 101 could access the files 303 of a user of another virtual process 101. Similarly, a super-user of one virtual process 101 could terminate the processes 301 associated with a user of another virtual process 101. Indeed, a super-user of one virtual process 101 could obtain exclusive access to all system resources, effectively disabling the other virtual processes 101. Clearly, granting a user of each virtual process 101 full super-user privileges would seriously compromise system security, entirely removing the illusion that each virtual process 101 is running on a dedicated host computer.

Figure 11:
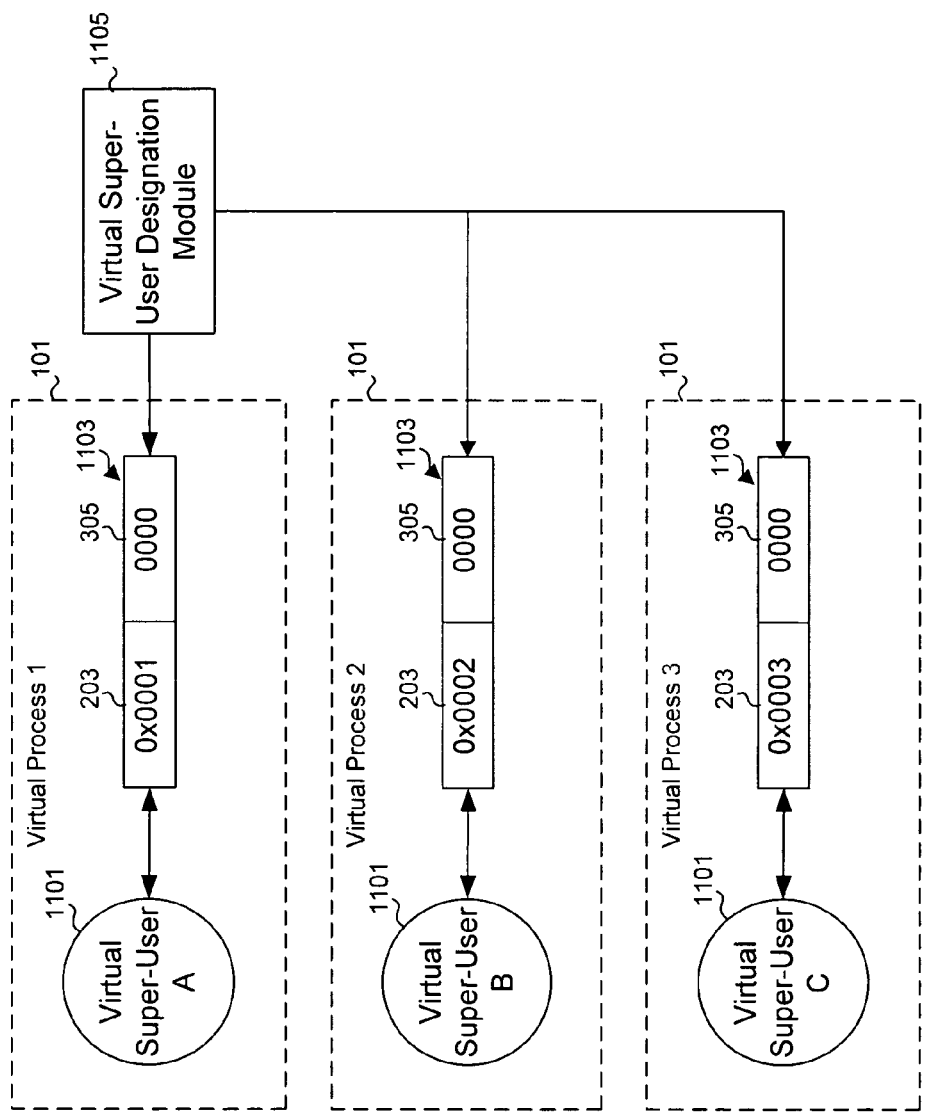
FIG. 11 is a block diagram of virtual processes and corresponding virtual super-users.

As illustrated in FIG. 11, the present invention solves the foregoing problems, in one embodiment, by designating a plurality of virtual super-users 1101, typically one per virtual process 101. A virtual super-user 1101 has many of the privileges of an actual super-user with respect to his or her own virtual process 101. For example, a virtual super-user 1101 can add and delete users of the virtual process 101, access files 303 of any user of the virtual process 101, terminate processes 301 associated with the virtual process 101, and the like. However, a virtual super-user 1101 cannot, for instance, add or delete users of other virtual processes 101, access the files 303 of users of other virtual processes 101, or terminate the processes 301 associated with other virtual processes 101.

In one embodiment, a virtual super-user 1101 is designated by assigning to a user a virtual super-user identifier (VSUID) 1103. The VSUID 1103 may be assigned by a virtual super-user designation module 1105, which generates a VSUID 1103 for each virtual super-user 1101, as described below.

A UID 305 of zero is interpreted by UNIX® and related operating systems as the super-user UID 305. However, assigning a UID 305 of zero to each virtual super-user 1101 would result in the problems discussed above, since an actual super-user has unfettered access to all system resources.

Accordingly, a VSUID 1103 comprises, in one embodiment, a super-user UID 305 (e.g., 0), which has been encoded with an indication of a virtual process 101 (e.g., VPID 203) using the techniques described with reference to FIGS. 5–6. As explained above, a UID 305 may be divided, in one implementation, into two 16 bit portions, with the upper 16 bits used to encode a VPID 203, and the lower 16 bits used to store the original UID 305.

For instance, as shown in FIG. 11, a VPID 203 of 1 is encoded within the upper 16 bits of the VSUID 1103, resulting in a VSUID 1103 of 0x00010000. Likewise, a VPID 203 of 2 results in a VSUID 1103 of 0x00020000. Finally, a VPID 203 of 3 results in a VSUID 1103 of 0x00030000. Of course, those skilled in the art will recognize that the VSUID 1103 may be encoded in various ways without departing from the spirit and scope of the invention.

From the standpoint of the operating system 117, however, the VSUID 1103 is not a super-user UID 305, and does not convey any super-user privileges. For example, a VSUID 1103 of 0x00010000 has a decimal value of 65536, clearly not a UID 305 of zero. Thus, without more, a virtual super-user 1101 would have all of the limitations of a regular user.

Figure 12:
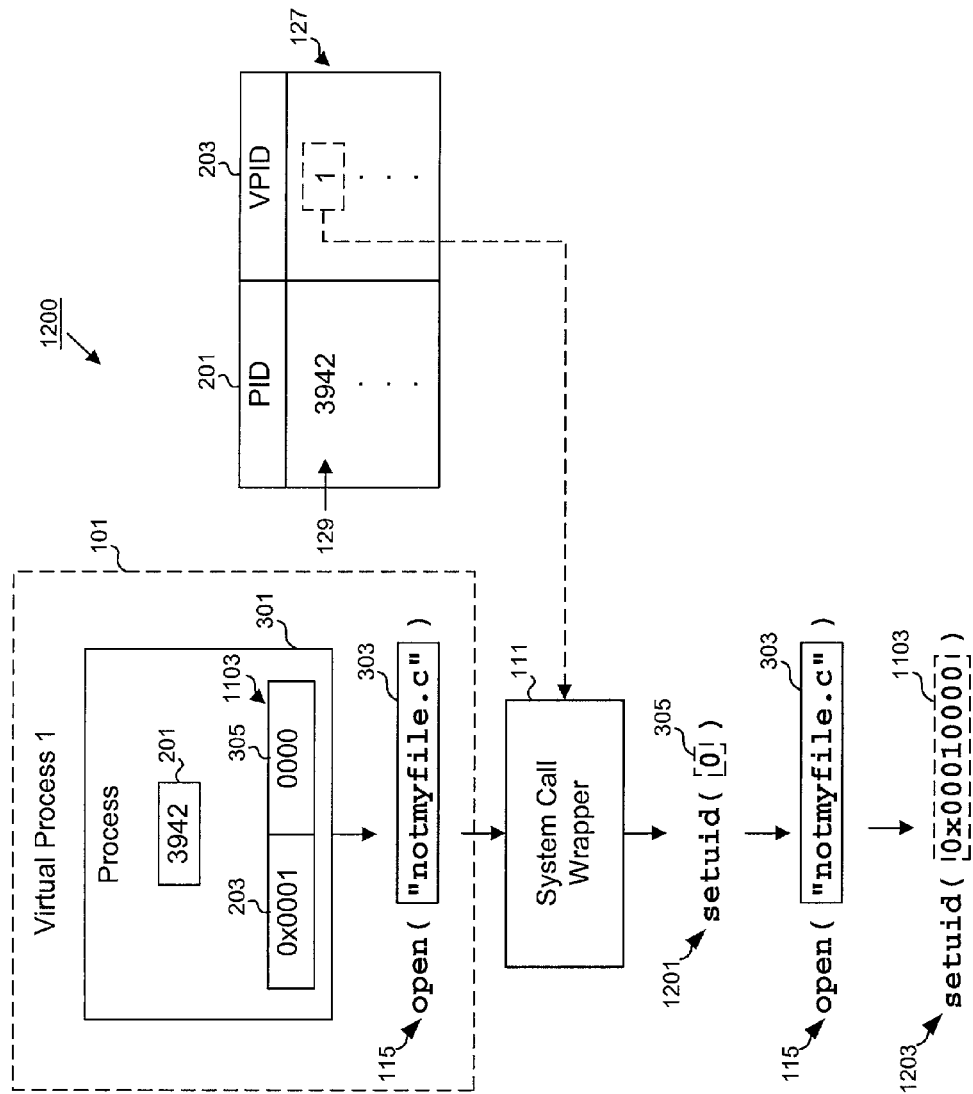
FIG. 12 is a block diagram of a system for virtualizing super-user privileges.

Consequently, as shown in FIG. 12, selected system calls 115 are intercepted for performing operations requiring actual super-user privileges, which are nevertheless desirable for a virtual super-user 1101 to perform in the context of his or her own virtual process 101. For example, system calls 115 are intercepted that operate on files 303, e.g., open( ), creat( ), link( ), unlink( ), chdir( ), fchdir( ), symlink( ), readlink( ), readdir( ), access( ), rename( ), mkdir( ), rmdir( ), truncate( ), and ftruncate( ). Of course, those skilled in the art will recognize that the invention is not limited to any particular operating system 117 or terminology.

As noted above, a normal user is typically restricted from opening, deleting, renaming, etc., a file 303 owned by another user. However, a virtual super-user 1101 should appear, in most respects, to be an actual super-user for operations pertaining to his or her own virtual process 101.

Thus, in one embodiment, if a system call 115 is "made" by a virtual super-user 1101 (i.e., by a process 301 owned by a virtual super-user 1101) and pertains to the virtual process 101 of the virtual super-user 1101, then actual super-user privileges are temporarily granted to the virtual super-user 1101 for purposes of the system call 115. This may be accomplished, in one embodiment, by executing an appropriate function, e.g., setuid( ), to assign a UID 305 of zero or other designation of super-user privileges to the calling process 301. After the system call 115 is executed, the super-user privileges may be withdrawn by executing the same function to restore the VSUID 1103.

Whether the system call 115 was made by a virtual super-user 1101 may be determined by checking whether the owner of the calling process 301 has a VSUID 1103. Of course, if the system call 115 was not made by a virtual super-user 1101, the wrapper 111 preferably disallows execution of the system call 115. For instance, the wrapper 111 may generate an error message, indicating a privilege violation. Alternatively, the wrapper 111 may simply allow the system call 115 to proceed without granting actual super-user privileges, resulting in the operating system 117 disallowing execution of the system call 115, since the VSUID 1103 does not convey actual super-user privileges.

Whether the system call 115 pertains to the virtual process 101 of the virtual super-user 1101 may be determined by checking whether the system resource(s) affected by the system call 115 relate to the virtual process 101 of the virtual super-user 1101. For example, with respect to system calls 115 that affect processes 301 (such as kill( )), the virtual process table 127 may be checked to determine whether the process 301 has an association 129 with the virtual process 101 of the virtual super-user 1101. Similarly, in one embodiment, each virtual process 101 has a distinct file system, allowing the wrapper 111 to easily determine whether a file 303 referenced by the call 115 is associated with the virtual process 101 of the virtual super-user 1101.

As shown in FIG. 12, suppose that a process 301 owned by a virtual super-user 1101 attempts to execute the open( ) system call 115 in order to open another user's file 303, which is nevertheless associated with the virtual process 101 of the virtual super-user 1101. The virtual process 101 (e.g., VPID 203) may be determined, in one embodiment, by referencing the virtual process table 127 using the PID 201 of "3942."

Since the file 303 pertains to the virtual process 101 of the virtual super-user 1101, the system call wrapper 111 temporarily grants actual super-user privileges to the virtual super-user 1101. In the illustrated embodiment, this is accomplished by executing an appropriate system call 1201 (e.g., in UNIX®, the setuid( ) function with a UID 305 of zero). The system call 115 is then executed, after which the wrapper 111 withdraws the actual super-user privileges 1101 by executing, for example, an appropriate system call 1203 (e.g., in UNIX®, the setuid( ) function with the original VSUID 1103 of the virtual super-user 1101). This approach grants super-user privileges on a call-by-call basis.

Thus, a virtual super-user 1101 may perform an operation for which actual super-user privileges are required, without granting the virtual super-user 1101 unfettered access to all of the system's resources. This allows each virtual process 101 to have at least one system administrator with limited super-user-like powers, while maintaining the illusion that each virtual process 101 is running on a dedicated host computer.

Other system calls 115 that may be intercepted include system calls 115 for terminating a process 301. In UNIX®, the kill() system call 115 allows a user to terminate one or more processes 301. For example, executing the kill() system call 115 with a specified process 301 (e.g., PID 201) terminates that process 301. Executing the kill() system call 115 with an argument of −1 results in the termination of all of the user's processes 301. An argument of less than −1 results in the termination of all of the processes 301 associated with a group (e.g., GID 307, where the GID value is equal to the absolute value of the argument).

As noted above, a super-user may terminate any system process 301. Thus, if the super-user specifies a PID 201, the corresponding process 301 will be terminated. Likewise, if the super-user specifies a negative GID 307, the processes 301 belonging to the specified group are terminated. If, however, the super-user specifies an argument of −1, all processes 301 other than those with PID 201 of 0 or 1 are terminated.

In one embodiment, it is desirable for a virtual super-user 1101 to be able to terminate processes 301 associated with his or her virtual process 101. Accordingly, the system call wrapper 111 intercepts system calls 115 for terminating processes 301 (e.g., kill()).

Where a virtual super-user 1101 attempts to terminate a specific process 301 associated with his or her virtual process 101, the wrapper 111 proceeds as discussed above with reference to FIG. 12. In other words, the wrapper 111 grants temporary actual super-user privileges to the calling process 301 and allows execution of the system call 115.

Figure 13:
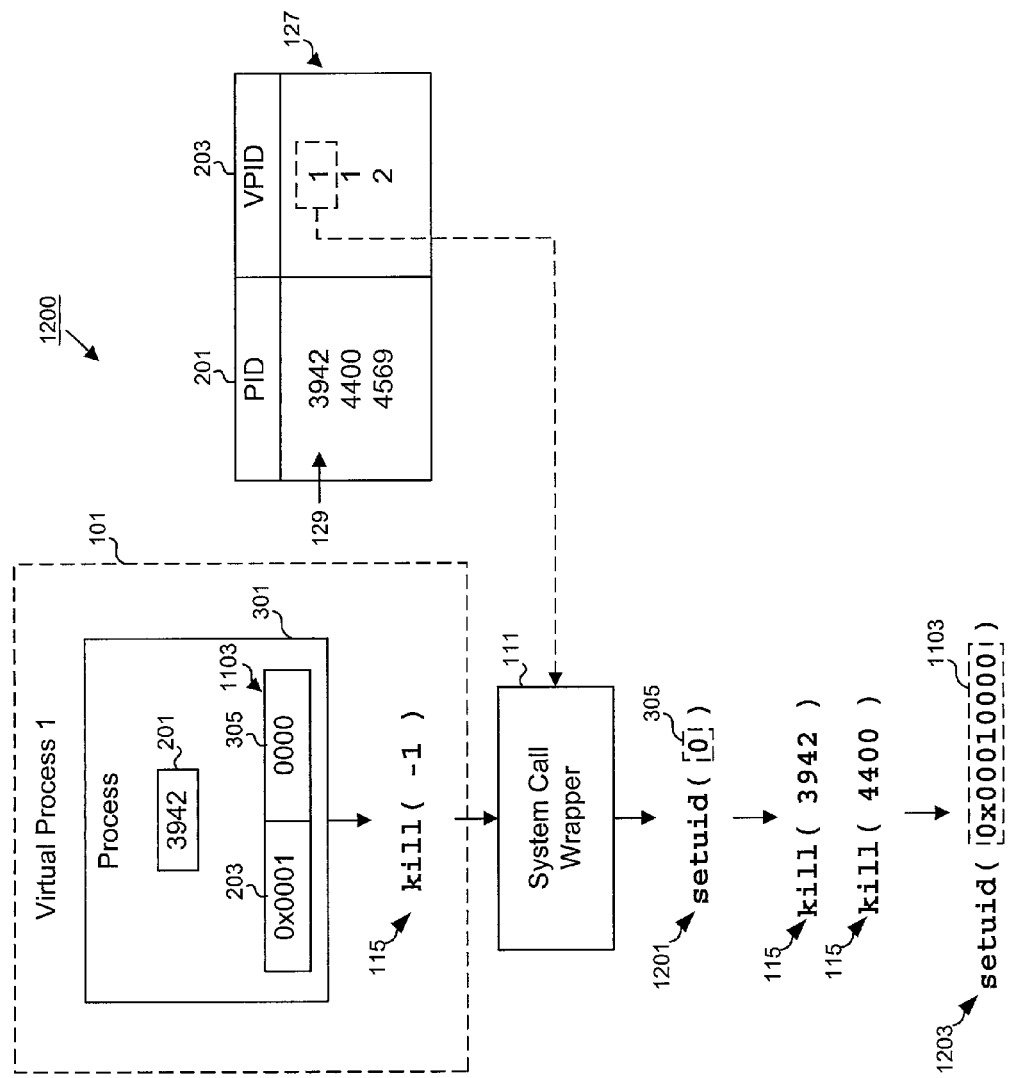
FIG. 13 is a block diagram of a system for virtualizing super-user privileges.

However, as shown in FIG. 13, where the system call 115 specifies a negative parameter, the wrapper 111 proceeds differently. Since the powers of virtual super-user 1101 should be limited to his or her virtual process 101, a kill() system call 115 with an argument of −1 results only in the termination of processes 301 associated with the virtual process 101. Thus, in one embodiment, a kill(−1) system call 115 "pertains" to the virtual process 101 by definition.

In one embodiment, the system call wrapper 111 iterates through the virtual process table 127, terminating all processes 301 associated with the virtual process 101. Thus, a kill(−1) system call 115 operates in the manner expected, maintaining the illusion that the virtual process 101 of the virtual super-user 1101 is executing on a dedicated host machine.

Likewise, in the case of an argument of less than −1, denoting a GID 307, the wrapper 111 cycles through all of the processes 301 associated with the virtual process 101 of the virtual super-user 1101 and determines whether each such process 301 corresponds to the specified group (e.g., GID 307). If so, those processes 301 are terminated in the manner discussed above.

As an example, as shown in FIG. 13, suppose that a process 301 is associated with a virtual process 1 (e.g., having a VPID 203 of 1). The process 301 is owned by a virtual super-user 1101 by virtue of the VSUID 1103 (e.g., 0x00010000), and pertains to the virtual process 101 by definition. Accordingly, the wrapper 111 grants temporary actual super-user privileges to the calling process 301 by executing the system call 1201.

Thereafter, the wrapper 111 iterates through the virtual process table 127, identifying each process 301 (e.g., PIDs 3942 and 4400) associated with a VPID 203 of 1. System calls 115 (e.g., kill(3942), kill (4400)) are then made to terminate each of the identified processes 301, after which the actual super-user privileges are withdrawn by executing the system call 1203.

A variety of other system calls 115 may be intercepted within the scope of the invention in order to grant limited super-user privileges to a virtual super-user 1101. Those skilled in the art will know how to apply the above-described techniques in the context of these other system calls 115.

In some instances, it is desirable to prevent a virtual super-user 1101 from executing certain system calls 115 altogether. For example, in UNIX®, the insmod() and rmmod() functions allow a super-user to insert modules into, and remove modules from, the operating system kernel 109. Giving such powers to a virtual super-user 1101 could seriously compromise system security, allowing the virtual super-user 1101 to alter the basic functionality of the operating system 117.

In one embodiment, a virtual super-user 1101 is prevented from executing a system call 115 for which actual super-user privileges are required by simply not intercepting the call 115. Since the VSUID 1103 is not a super-user UID 305, the operating system 117 will automatically reject an attempt by a virtual super-user 1101 to execute, for example, the insmod() call 115.

In an alternative embodiment of the invention, a virtual super-user 1101 is not designated by assigning a VSUID 1103, as discussed above. Rather, a virtual super-user 1101 is simply assigned a UID 305 as in the case of other users. Thereafter, the assigned UID 305 is stored in a virtual super-user list 1401 or other suitable data structure, as illustrated in FIG. 14, together with an indication of the virtual process 101 (e.g., VPID 203). Accordingly, when selected system calls 115 are intercepted for which actual super-user privileges are required, a user may be identified as a virtual super-user 1101 by consulting the virtual super-user list 1401.

Since virtual super-users 1101 in this embodiment are given regular UIDs 305, the possibility of conflicts between virtual processes 101 arises. However, such conflicts may be resolved using the techniques described in FIGS. 9–10, i.e. intercepting system calls 115 for setting a UID 305 of a resource and assigning an alternative UID 901. Thus, virtual super-users 1101 of different virtual processes 101 may appear to share the same UID 305 without conflict.

Figure 15:
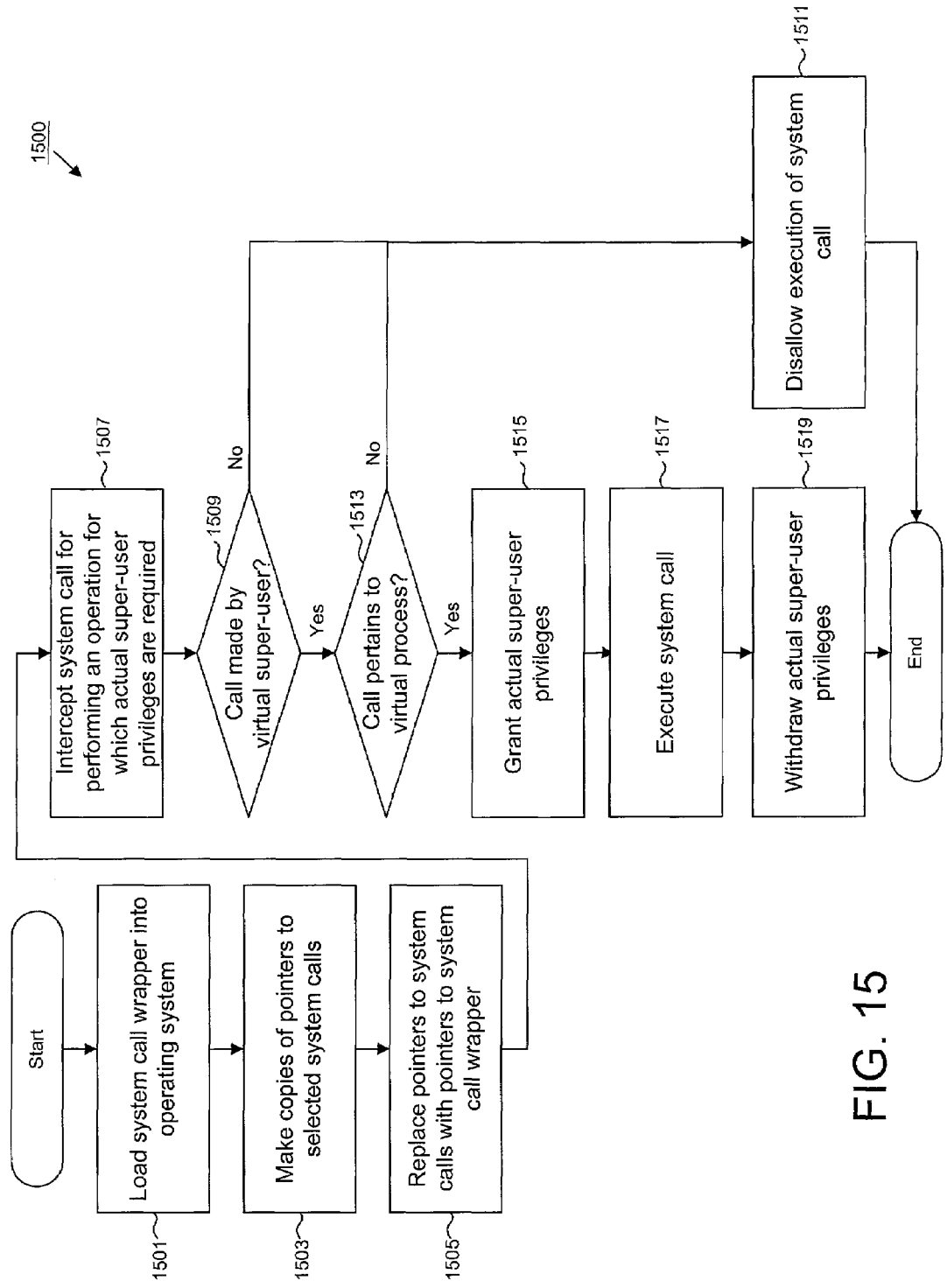
FIG. 15 is a flowchart of a method for virtualizing super-user privileges.

FIG. 15 summarizes the above-described techniques. A method 1500 for virtualizing super-user privileges has two phases, preparation and operation. The preparation phase begins by loading 1501 a system call wrapper 111 into the operating system 117. Thereafter, copies are made 1503 of pointers 114 to selected system calls 115 for performing operations for which actual super-user privileges are required, which are nevertheless desirable to be performed by a virtual super-user 1101 with respect to his or her own virtual process 101 (e.g., open(), kill(), etc.). The pointers 114 are then replaced 1505, in one implementation, by pointers 118 to the system call wrapper 111. Thus, when one of the selected system calls 115 is made, the system call wrapper 111 is executed instead During the operation phase, a system call 115 is intercepted 1507 by the system call wrapper 111. Thereafter, the wrapper 111 determines 1509 whether the call 115 was "made" by a virtual super-user 1101 (i.e. by a process 301 owned by a virtual super-user 1101). If not, the system call 115 is disallowed 1511, and the method 1500 ends.

If, however, the call 115 was made by a virtual super-user 1101, a determination 1513 is made whether the call 115 pertains to the virtual process 101 of the virtual super-user 1101. If not, the call 115 is disallowed, and the method 1500 ends.

If, however, the call 115 pertains to the virtual process 101 of the virtual super-user 1101, actual super-user privileges are granted to the virtual super-user, after which the system call 115 is executed 1517. Finally, the actual super-user privileges are withdrawn 1519, and the method 1500 ends.

In view of the foregoing, the present invention offers numerous advantages not available in conventional approaches. For example, super-user privileges are virtualized in an operating system 117 including multiple virtual processes 101, such that a virtual super-user has the power to perform traditional system administrator functions with respect to his or her own virtual process 101, but is unable to interfere with other virtual processes 101 or the underlying operating system 117. Thus, each virtual process 101 can have a virtual super-user 1101, while preserving the illusion that the virtual processes 101 are running on dedicated host machines.

As will be understood by those familiar with the art, the invention may be embodied in other specific forms without departing from the spirit or essential characteristics thereof. Likewise, the particular naming of the modules, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A computer-implemented method for virtualizing super-user privileges in a computer operating system including multiple virtual private servers, the method comprising:

associating a user with a first virtual private server, the first virtual private server comprising a first plurality of actual processes executing within the same operating system as a second plurality of actual processes comprising a second virtual private server;

designating the user as a virtual super-user;

intercepting a call to the operating system for which actual super-user privileges are required, the call made by a process located in the operating system, the process owned by the user, wherein intercepting the call to the operating system comprises:

loading a system call wrapper;

saving a pointer to the call to the operating system, wherein the pointer to the call to the operating system comprises a system call vector; and replacing the pointer to the call to the operating system with a pointer to the system call wrapper, such that the system call wrapper is executed when the call to the operating system is invoked; and in response to the intercepted call to the operating system pertaining to the first virtual private server:

granting actual super-user privileges to the user; and allowing execution of the call to the operating system.

2. A computer program product for virtualizing super-user privileges in a computer operating system including multiple virtual private servers, the computer program product comprising a computer-readable medium and computer program code encoded on the medium for:

associating a user with a first virtual private server, the first virtual private server comprising a first plurality of actual processes executing within the same operating system as a second plurality of actual processes comprising a second virtual private server;

designating the user as a virtual super-user;

intercepting a call to the operating system for which actual super-user privileges are required, the call made by a process located in the operating system, the process owned by the user, wherein intercepting the call to the operating system comprises:

loading a system call wrapper;

saving a pointer to the call to the operating system, wherein the pointer to the call to the operating system comprises a system call vector; and replacing the pointer to the call to the operating system with a pointer to the system call wrapper, such that the system call wrapper is executed when the call to the operating system is invoked; and granting actual super-user privileges to the user, and allowing execution of the call to the operating system, in response to the intercepted call to the operating system pertaining to the first virtual private server.

* * * * *